United States Patent [19]

Higgs et al.

[11] Patent Number: 5,061,917
[45] Date of Patent: Oct. 29, 1991

[54] ELECTRONIC WARNING APPARATUS

[76] Inventors: Nigel H. Higgs; John R. Storey, both of R.R. #2, Bath, Ontario, Canada, K0H 1G0; Sean D. McLaughlin, 55 River Road, Napanee, Ontario, Canada

[21] Appl. No.: 506,999

[22] Filed: Apr. 10, 1990

Related U.S. Application Data

[63] Continuation-in-part of Ser. No. 347,907, May 5, 1989, abandoned.

[30] Foreign Application Priority Data

May 6, 1988 [CA] Canada ................... 566249

[51] Int. Cl.$^5$ .......................... G08B 1/08; H04Q 7/00
[52] U.S. Cl. .................... 340/539; 340/531; 340/525; 340/447
[58] Field of Search ............... 340/539, 531, 525, 442, 340/445, 447

[56] References Cited

U.S. PATENT DOCUMENTS

| | | | |
|---|---|---|---|
| 1,908,503 | 5/1933 | Behrend et al. | |
| 1,974,906 | 9/1934 | Willcox | |
| 2,033,424 | 3/1936 | Gieskieng | |
| 2,818,732 | 1/1958 | Bennett | 73/362 |
| 3,370,459 | 2/1968 | Cescati | 73/146.5 |
| 3,380,021 | 4/1968 | Dudar | 340/58 |
| 3,491,335 | 1/1970 | MacConochie | 340/57 |
| 3,614,731 | 10/1971 | Hluchan et al. | 340/57 |
| 3,614,732 | 10/1971 | Lejeune | 340/58 |
| 3,691,523 | 9/1972 | Helms | 340/57 |
| 3,792,434 | 2/1974 | Williams | 340/57 |
| 3,852,717 | 12/1974 | Hosaka et al. | 340/58 |
| 3,881,170 | 4/1975 | Hosaka et al. | 340/52 |
| 4,153,881 | 5/1979 | Permut et al. | 340/539 |
| 4,191,948 | 3/1980 | Stockdale | 340/539 |
| 4,494,106 | 1/1985 | Smith et al. | 340/58 |
| 4,521,645 | 6/1985 | Carroll | 340/525 |
| 4,540,976 | 9/1985 | Wegrzyn | 340/539 |
| 4,574,267 | 3/1986 | Jones | 340/58 |
| 4,581,606 | 4/1986 | Mallory | 340/539 |

FOREIGN PATENT DOCUMENTS 62045 9/1989 Taiwan .
68909 9/1989 Taiwan .

OTHER PUBLICATIONS

Article: "Tire Needs Air!"; Popular Science, Mar. 1988, pp. 50-53.

Primary Examiner—Donnie L. Crosland
Attorney, Agent, or Firm—Weldon F. Green

[57] ABSTRACT

Warning apparatus comprising a transmitter for producing a coded signal and a monitor for detecting such signal; the transmitter including a detection circuit comprising sensors responsive to abnormal conditions at a location in a region near the transmitter, a circuit for generating a coded signal in response to the abnormal condition detected, and a circuit for transmitting the coded signal for reception by the monitor; the monitor including a circuit for receiving the coded signal transmitted, an electronic circuit for decoding the coded signal received, and an electronic circuit for displaying the type of abnormal condition detected by the sensor and the location of the transmitter which detected the abnormal condition.

29 Claims, 23 Drawing Sheets

ELECTRONIC WARNING APPARATUS

This is a continuation-in-part of co-pending application Ser. No. 347,907, filed on May 5, 1989, now abandoned.

FIELD OF INVENTION

This invention relates to improvements in an electronic warning apparatus comprising a monitor, for receiving a coded radio frequency signal, and at least one transmitter unit and associated sensors for producing the coded radio frequency signal upon detecting an abnormal condition at the location of the sensors. The monitor including means for providing appropriate visual and audio alarms upon reception of the signal.

Particularly, this invention relates to improvements in an electronic warning apparatus for use in vehicles, such as tractor trailers, wherein the transmitting unit is located remotely from the monitor and transmits a coded radio frequency signal upon detecting through its associated sensors an abnormal condition such as low tire pressure, excessive heat generated by failing wheel bearings, locked or over heated brakes, or abnormal conditions caused by other malfunctions resulting in excessive heat, as well as excessive vibrations caused by a wheel bearing, loose lug nut on the wheel, a broken steel belt in the tire, separation of the recapped tire, or other disturbances which would give rise to excessive vibration.

Moreover, this invention relates to improvements in an electronic warning apparatus wherein the transmitters transmit a coded radio frequency signal upon detection of an abnormal condition at the location of the sensors: the coded radio frequency signal comprising a location code so the monitor, upon reception of the radio frequency signal, can distinguish which of the associated transmitters detected the abnormal condition as well as the type of abnormal condition detected.

BACKGROUND TO THE INVENTION

Systems under consideration normally comprise miniature electronic apparatus including means for detecting abnormal tire pressure as well as sensing means for detecting trailer wheel bearing temperature.

One example of miniaturized electronic apparatus for detecting malfunction from a source on a vehicle is that disclosed in U.S. Pat. No. 3,491,335.

U.S. Pat. No. 3,491,335, discloses a temperature detection system wherein a temperature sensor controls a transmitter that emits a signal to a remote receiver upon detecting excessive heat, activating a warning device.

U.S. Pat. No. 3,491,335 further discloses the use of a temperature sensor which can be utilized to energize a transmitter that emits a radio frequency signal to a remote receiver for activation of a warning device.

Particularly, U.S. Pat. No. 3,491,335 utilizes a bi-metallic sensor which moves in accordance with the temperature on the wheel to which it is attached to close, respectively, a primary circuit and a secondary circuit which causes the transmitter to be energized and emit a signal. Closing of the primary circuit energizes the transmitter to emit a signal at a given predetermined frequency. As the temperature sensed increases the bi-metallic sensor causes the secondary circuit to be closed which energizes a subcarrier oscillator to modulate the signal and algebraically add the frequencies of the transmitter signal. The receiver at a remote location from the transmitter accepts the signal and, when only moderate temperatures have been sensed at the wheel of the vehicle, the receiver activates a warning light. When excessive temperatures are encountered the secondary circuit is closed and the receiver picks up the modulated signal and activates a warning speaker.

Another example of warning or alarm systems for vehicles includes U.S. Pat. No. 3,380,021, which discloses tire pressure and wheel bearing indicators in combination and includes means for indicating to the operator of the vehicle the tire pressure and wheel bearing temperature.

All of the prior alternatives, however, require, particularly in the case of vehicles such as tractor trailers, extensive modification to the axles to install the device making them impractical to add on for use with existing vehicles.

Further, in the case of vehicles such as tractor trailers installation at the time of manufacture would not benefit the operators of the great many tractor trailers presently in use worldwide. Further, it is the nature of tractor trailer operators to distrust any apparatus which would require extensive modification to the vehicle to be installed.

This invention overcomes the disadvantages of the prior art without requiring, as in the case of tractor trailers, extensive modification to existing vehicles presently in the marketplace as will hereinafter become clear upon reading description of the preferred embodiment of the invention.

OBJECTS OF THE INVENTION

It is an object of this invention to provide improved apparatus comprised of at least one transmitter, for emitting a radio frequency signal upon detection by associated sensors of an abnormal condition at the location of that sensor, and a monitor, for receiving the radio frequency signal transmitted and for providing visual and audio alarms upon reception of such signal.

It is a further object of this invention to provide the transmitter with a code identifying the location of that transmitter for a given system.

Further, it is an object of this invention to provide improved apparatus wherein the transmitter includes coding means indicating the type of abnormal condition sensed.

More particularly, the coding means indicating the type of abnormal condition sensed is combined with the location code for transmission.

A further object of the invention is to provide improved apparatus including a monitor and associated transmitters for use in a vehicle such as a tractor trailer wherein the monitor receives a coded radio frequency signal emitted from the remotely located transmitters when the associated sensors of the transmitters detect an abnormal condition such as low tire pressure, excessive heat generated by failing wheel bearings, locked or overheated brakes, or other abnormal conditions caused by malfunctions resulting in excessive heat, and also excessive vibrations caused by a failed wheel bearing, a loose lug nut on the wheel, a broken steel belt in the tire, a separation of a recapped tire, or other disturbances which would give rise to excessive vibration.

Further, this invention is not limited to detecting the abnormal conditions described but can be utilized in detecting abnormal conditions which could arise in a failing refrigeration car of a tractor trailer or a train; it can be utilized in monitoring temperatures in vans or trailers carrying live stock or perishable goods.

Further, this invention can be utilized with sensors for detecting shifting loads in tractor trailers, or a variety of other conditions, not limited to tractor trailers, wherein temperature, vibration, electrical voltage, and other conditions are sensed and coded by a transmitter for transmission to a remote monitor.

Moreover, the improved apparatus meets all of the above objects without requiring the use of complex circuitry providing easy use of same in a variety of locations and differing settings.

FEATURES OF THE INVENTION

It is a feature of the invention to provide warning apparatus for sensing conditions at a remote source comprising a transmitter located in the region of the remote source for transmitting a coded signal, and a monitor for receiving the signal. The transmitter comprises sensing means responsive to abnormal conditions at the remote source, coding means for generating the coded signal, and means for transmitting the signal. The monitor comprises means for detecting the coded signal, means for decoding the signal received, and means for indicating the abnormal conditions detected by the sensing means of the transmitter.

Further, it is a feature of the invention to provide a coded signal in the form of a coded radio frequency signal.

More particularly, it is a feature of this invention to divide the coded signal into two parts: the first part identifying the location of the remote source where the abnormal condition is sensed, and the second part identifying the type of abnormal condition sensed.

It is also a feature of this invention for the coding means of the transmitter to comprise a parallel-to-serial converter.

Still further, it is a feature of this invention for the decoding means of the monitor to comprise of a serial-to-parallel converter.

Moreover, it is a feature of this invention for the coding means of the transmitter unit for generating the coded signal to comprise a data latch circuit.

Finally, it is a feature of this invention for the monitor to comprise of appropriate audio warning circuits and visual display circuits to alert the operator of the vehicle of the location and type of abnormal condition sensed

DESCRIPTION OF THE INVENTION

These and other objects and features will become apparent in the following description of the preferred embodiment of the invention to be read in conjunction with the accompanying sheets of drawings in which.

According to the invention a typical alarm system of the type under consideration, particularly for vehicles such as a tractor trailer, includes a monitor 10, located, as in the preferred embodiment, in the cab of the vehicle, for receiving a coded radio frequency signal, and at least one transmitter unit 12 and associated sensors for transmitting such coded radio frequency signal upon detecting an abnormal condition such as low tire pressure, excessive heat generated by failing wheel bearings, locked or over heated brakes, or abnormal conditions caused by other malfunctions resulting in excessive heat, and also excessive vibrations caused by a wheel bearing, loose lug nut on the wheel, a broken steel belt in the tire, a separation of a recapped tire, or other disturbances which would give rise to excessive vibrations.

Detection by any sensor of an abnormal condition activates transmitter unit 12 to transmit a coded radio frequency signal lying within the appropriate governmental specifications, and in the preferred embodiment at approximately 20 KHz, for reception by monitor 10. Monitor 10, upon receiving the signal from transmitter unit 12, decodes same, as hereinafter explained, and through appropriate audio and visual indications, alerts the operator of the vehicle to the problem detected.

Figure 1:
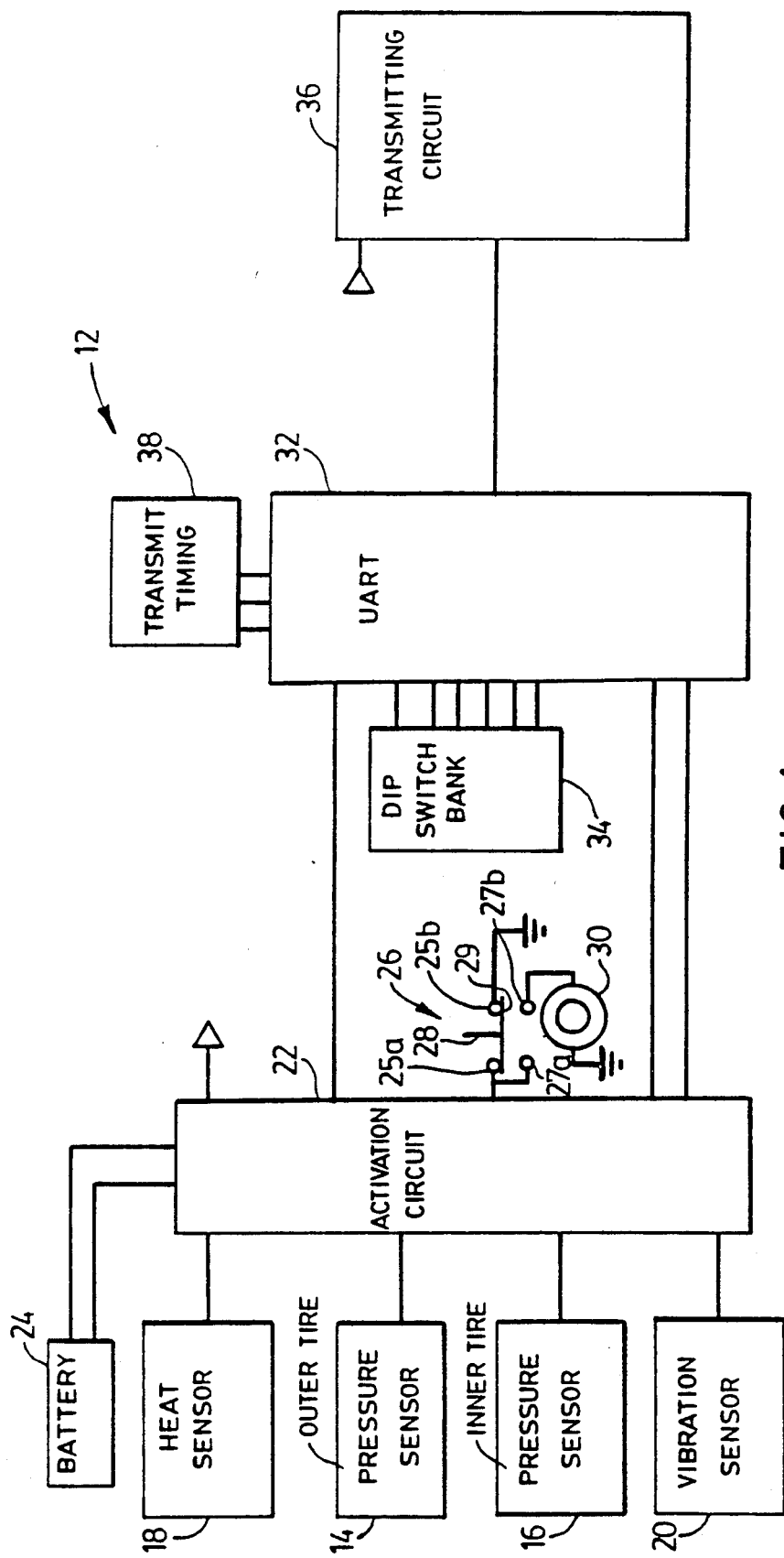
FIG. 1 is a block diagram of the transmitter unit of the preferred embodiment of the invention.

In the preferred embodiment transmitter 12, as best illustrated in block diagram in FIG. 1, comprises sensor means for detecting low tire pressure (outer and inner tire pressure sensors 14, 16, respectively), excessive heat (heat sensor 18) or vibration (vibration sensor 20) in the wheel and associated wheel bearings of the vehicle, such as a tractor trailer, and means 22 for activating transmitter unit 12 upon detection of an abnormal condition.

The transmitter includes a 9 volt dc power supply 24 and a means 26 for testing the power level of battery 24 through depressing plunger 28 and displacing contact 29 from a first position completing the circuit between leads 25a and 25b to a second position completing the circuit between leads 27a and 27b; an audible buzzer 30 is heard upon depressing plunger 28 and displacing contact 29 to the second position if 9 volt DC power supply 24 has sufficient charge indicating successful testing of the power supply. Testing means 26 is also used as a reset switch turning the transmitter unit "off" by breaking the circuit upon displacing contact 29 from the first position between leads 25a and 25b.

Upon activation of the transmitter unit after the sensors have detected an abnormal condition a signal is sent from activation circuitry 22 indicating which of sensors 14, 16, 18, or 20, has detected an abnormal condition to a Universal Asynchronous Receiver/Transmitter (UART) circuit 32, such as, in the preferred embodiment an integrated chip IM6403-1IPL. UART circuit 32 combines the sensor code received from activation circuit 22 with a location code received from dip switch assembly 34 indicating the location of the particular transmitter unit detecting the abnormal condition and sends the combined coded signal to transmitting circuit 36 where the signal is transmitted as a coded radio frequency signal to be picked up by monitor 10 located, as in the preferred embodiment, in the cab of the vehicle such as a tractor trailer: the timing of the transmissions from the transmitting circuit 36 is controlled by timing circuit 38.

Figure 2:
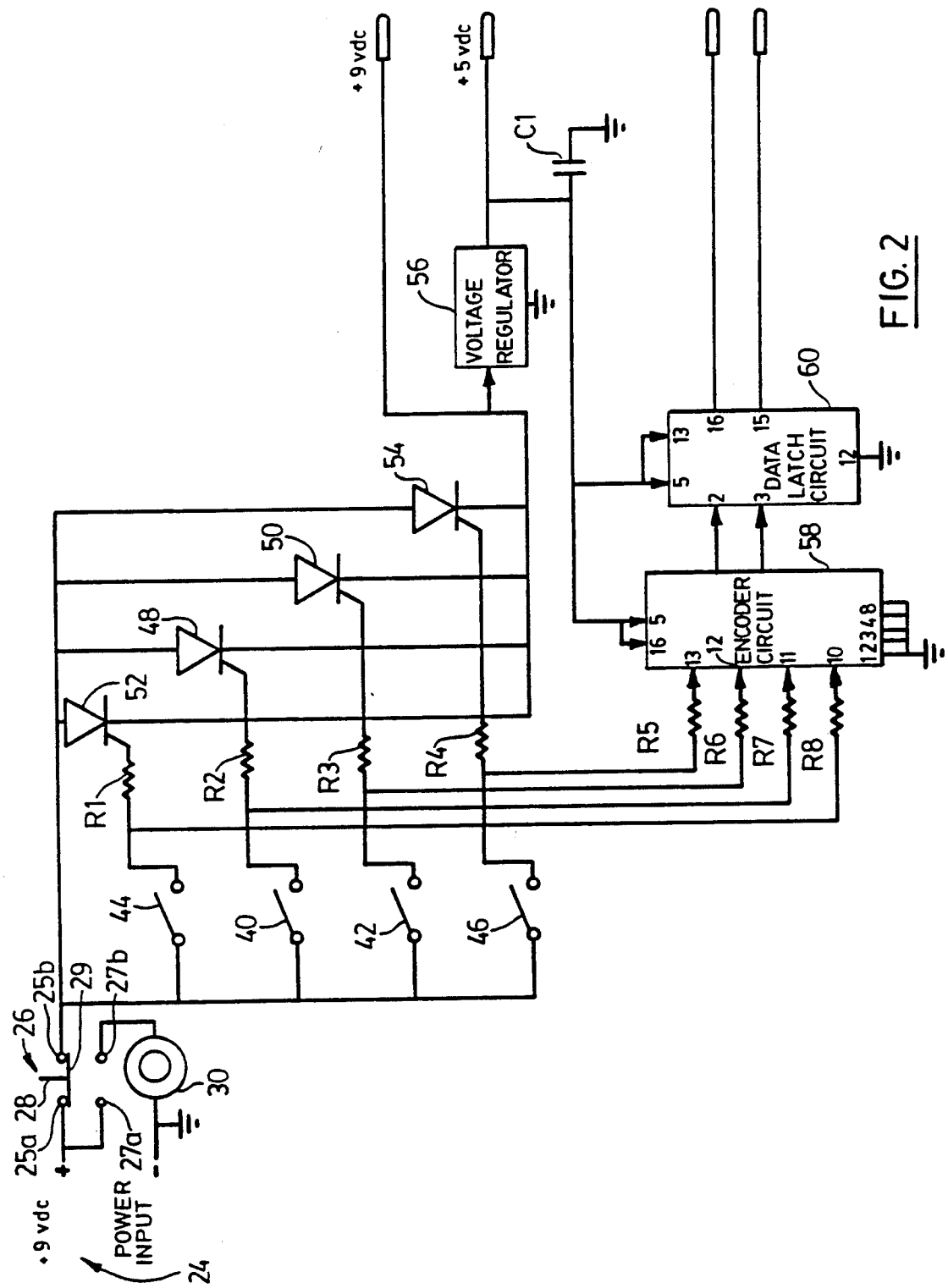
FIG. 2 is a circuit diagram of the activation circuitry of the transmitter unit of the preferred embodiment.

Sensors 14, 16, 18, and 20, and activation circuit 22 are detailed in FIG. 2. Particularly, sensors 14, 16, 18, and 20, comprise switches 40, 42, 44, and 46, respectively, and associated silicon controlled rectifiers 48, 50, 52, and 54, respectively. Upon detecting an abnormal condition the appropriate sensor 14, 16, 18, or 20, closes its respective switch 40, 42, 44, or 46 enabling corresponding silicon controlled rectifier 48, 50, 52, or 54, to pass 9 volts dc from power supply 24 to voltage regulator circuit 56 which reduces the 9 volt power supply to 5 volts for use by UART circuit 32. Note that since silicon controlled rectifiers 48, 50, 52, and 54, are in parallel, activation of any one sensor supplies the 9 volt power supply to voltage regulator 56.

Further, the reduced power supply of 5 volts dc from voltage regulator circuit 56 is used to power encoder circuit 58, such as, in the preferred embodiment, integrated circuit 74148, together with data latch circuit 60, such as, in the preferred embodiment, integrated circuit 7475.

Upon closing any one of switches 40, 42, 44 or 46 a 9 volt signal is supplied to the respective pins 11, 12, 10 or 13 of encoder circuit 58. Therefore the silicon controlled rectifier gates supply four bits of parallel data in the form of the presence or absence of a voltage produced by the closing or remaining open of respective switches 40, 42, 44 or 46 upon detection of an abnormal condition from associated sensors 14, 16, 18, and 20, respectively. Encoder circuit 58 encodes the four bits of data into two bits of information, which are in turn latched by data latch circuit 60.

For example, should switch 44 of sensor 18 be activated its corresponding line into encoder circuit 58 would be supplied with 9 volts DC from power supply 24. The remaining lines from switches 40, 42, and 46, remain low, i.e. 0 volts. These inputs represent the four bits of data which are encoded, namely, in this example reading in the order of pins 13, 12, 11, and 10: 0001. The encoder takes these four bits of data and converts them to two bits of binary information, for example 0001 becomes 00. Similarly, if switch 40, of sensor 14, closes, the four bits of data supplied to encoder circuit 58 would be represented as 0010. Encoder circuit 58 would then encode this result to the following two bit code: 01.

In the preferred embodiment the following encoding sequence is used:

| SENSOR | FOUR BIT DATA INPUT | TWO BIT DATA OUTPUT |
| --- | --- | --- |
| 18 | 0001 | 00 |
| 14 | 0010 | 01 |
| 16 | 0100 | 10 |
| 20 | 1000 | 11 |

Data latch circuit 60 receives the encoded two bits of information from encoder circuit 58 and retains such coded signal as long as power is provided from voltage regulator 56.

It can be appreciated that by using, in the preferred embodiment, data latch circuit 60 any short lived data indicating an abnormal condition will be retained for transmission by transmitter unit 12 indefinitely, even after the initial sensory data which activated the particular sensor has been shut off, or is no longer present. For example, should heat sensor 18 detect excessive temperatures switch 44 will close resulting in four bits of parallel data, namely 0001, being read by encoder circuit 58. The resulting encoded two bit data output, namely 00, is then read by data latch circuit 60, which in turn, outputs the two bit data code for transmission. Should sensor 18 no longer detect excessive heat or, alternatively, should sensor 18 "burn out" the data indicating the abnormal conditions may cease to exist. Data latch circuit 60, however, will continue to output the 00 two bit data output to UART circuit 32 and transmitting circuit 36 until plunger 28 of reset switch 26 has been depressed separating contact 29 from leads 25a, 25b, breaking the circuit and cancelling the power supply from voltage regulator 56 to data latch circuit 60. This feature is particularly useful since in tractor trailers excessive heat generated in a wheel of a vehicle should be investigated even if the initial sensory data which caused the sensor to activate is no longer present.

The two bit signal from data latch circuit 60 is then sent to UART circuit 32 which combines the two bits of sensor information with a six bit location code for that particular transmitter and then converts the combined eight bit parallel signal inputted to a serial data stream for transmitting.

Figure 3:
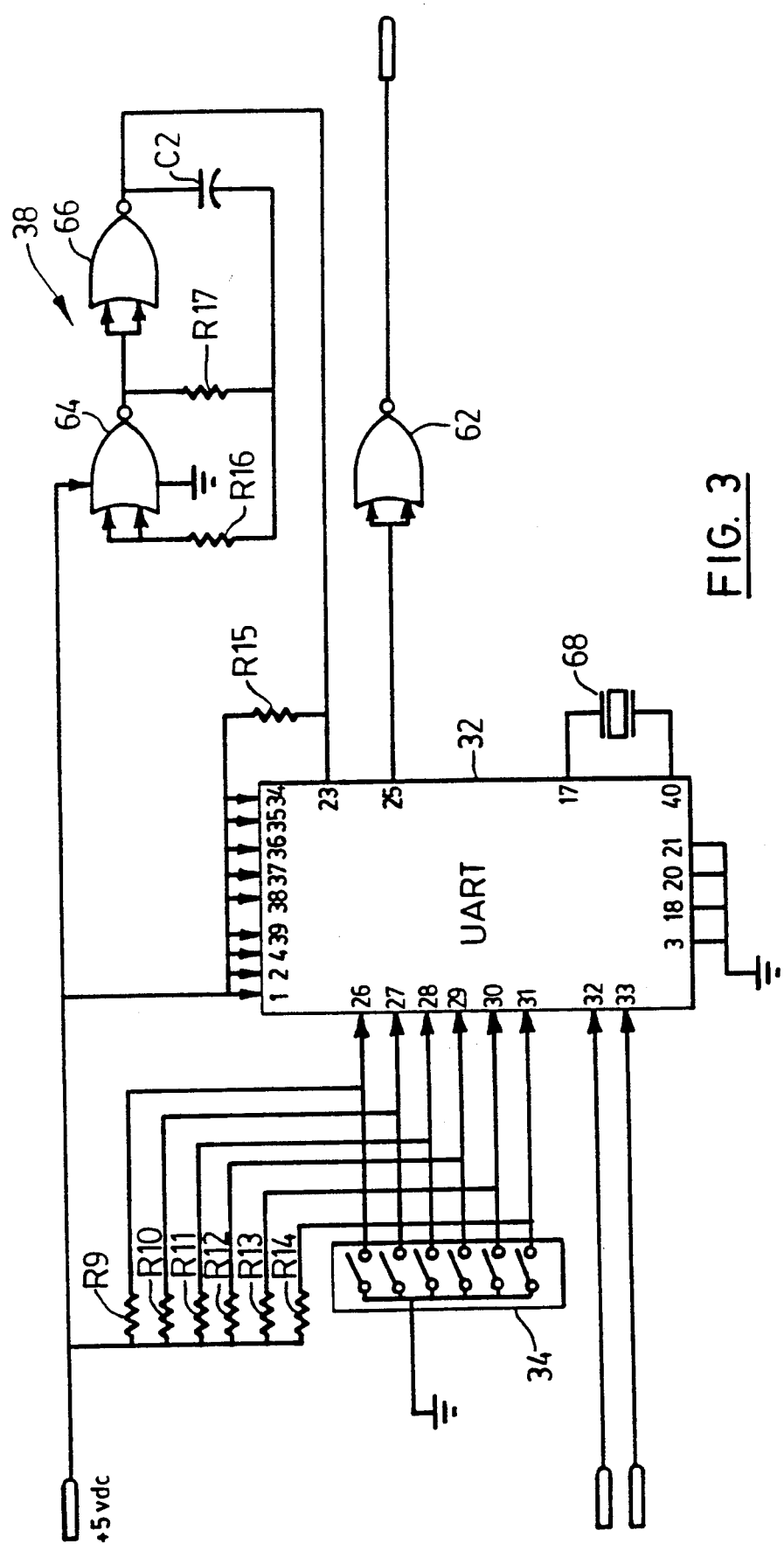
FIG. 3 is a circuit diagram of the encoding means of the preferred embodiment of the invention of the transmitter unit.

As best illustrated in FIG. 3 UART circuit 32 is supplied with the six bits of data relating to the location of the transmitter from dip switch assembly 34 which contains the code representing the location of the transmitter; the code being preset at the time of installation of the transmitter. It can be appreciated that by providing six bits for the code representing the location of the transmitter up to 64 different locations can be monitored on the vehicle: monitoring many locations is particularly important when dealing with vehicles such as tractor trailers. The two bit data from the detection circuit is combined with the six bits of data relating to location and the combined eight bits are transmitted by transmitting circuit 36 to monitor 10 indicating to the operator of the vehicle both the location of the abnormal condition detected together with the type of abnormal condition detected.

UART circuit 32 sends the eight bit serial data stream to transmitting circuit 36 through a NOT-GATE, or, as in the preferred embodiment, an inverted OR-GATE 62 at such a rate that the entire eight bit serial data stream is transmitted approximately twice every second. The timing of the rate of transmission is controlled by transmit timing circuit 38 which comprises two NOT-GATES or, as in the preferred embodiment, inverted OR-GATES 64, 66 in combination with a suitable capacitance C2, which in the preferred embodiment the capacitance is approximately 4.7 $\mu f$.

Upon receiving power from voltage regulator 56 transmit timing circuit 38 outputs a signal to pin 23 of UART circuit 32 approximately twice a second. Upon activation of pin 23 of UART circuit 32 by transmit timing circuit 38 pin 25 of the UART circuit sends to transmitting circuit 36 through a NOT-GATE or, as in the preferred embodiment, an inverted OR-GATE 62, the eight bit serial data stream.

The connections to UART circuit 32 are illustrated in FIG. 3 with the two bit data from the detection circuit being connected to pins 32, 33, and the 6 bits of data relating to location of the transmitter unit being connected to pins 26, 27, 28, 29, 30, and 31. The timing of UART circuit 32 is provided by a 1 megahertz crystal oscillator 68 which is connected to pins 17 and 40 of UART circuit 32.

Figure 4:
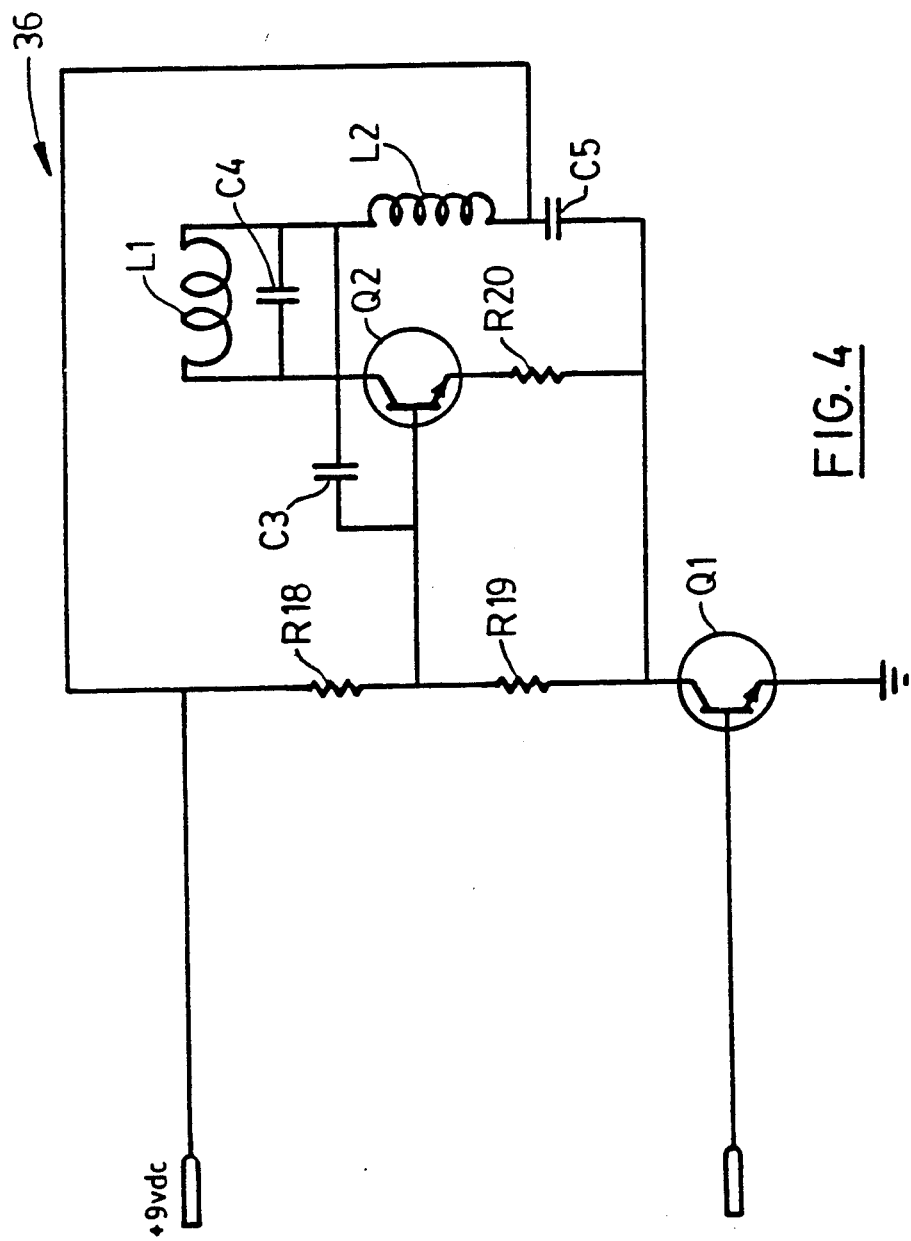
FIG. 4 is a circuit diagram of the transmitting circuit of the transmitter unit of the preferred embodiment of the invention.

Transmitting circuit 36 is illustrated in FIG. 4. The eight bit serial data stream is amplified through transistors Q1 and Q2 and then oscillated to a frequency determined by inductance L1 and capacitance C4 for transmission as a radio frequency signal. It is noted that by appropriately choosing inductance L1 and capacitance C4 a radio frequency signal comprising the eight bit serial data stream can be generated meeting governmental regulations.

The specifications of the various resistors, capacitors, inductances, and transistors, as utilized in the preferred embodiment are listed in the following table, however, it should be realized that these are by no means the only values acceptable to meet governmental regulations nor is the invention limited to the particular sensing means, coding means, timing means, and transmitting circuit means disclosed.

| COMPONENTS | SPECIFICATIONS |
| --- | --- |
| R1-15 | 3K3 1/4 watt 5% |
| R16 | 1 Megaohm |
| R17 | 100K |
| R18 | 6K2 1/4 watt +/− 5% |
| R19 | 1K5 1/4 watt +/− 5% |
| C1 | .1 $\mu f$ |
| C2 | 4.7 $\mu f$ electrolytic |
| C3 | 3.3 pf +/− .2 pf ceramic |
| C4 | 4.7 pf +/− .2 pf ceramic |

| COMPONENTS | SPECIFICATIONS |
| --- | --- |
| C5 | 33 pf +/− 5% ceramic |
| L1 | 2 turns 2mm aluminium ferrite core |
| L2 | 14 turns #22 wire |
| Q1 | 2N2222 |
| Q2 | PN918 |
| SCR 1-4 | C106B |

Figure 5:
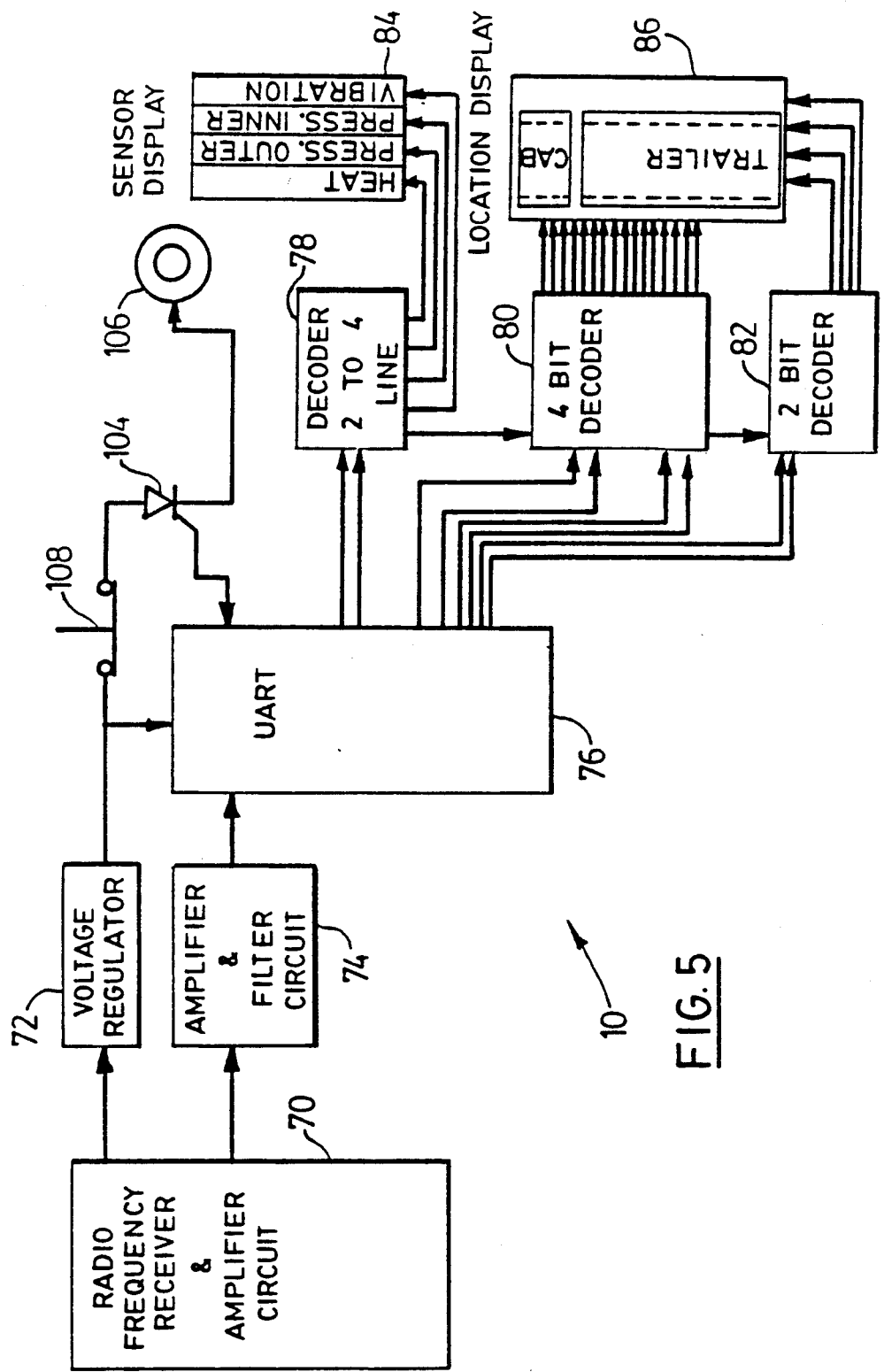
FIG. 5 is a block diagram of the monitor of the preferred embodiment of the invention.
Figure 6:
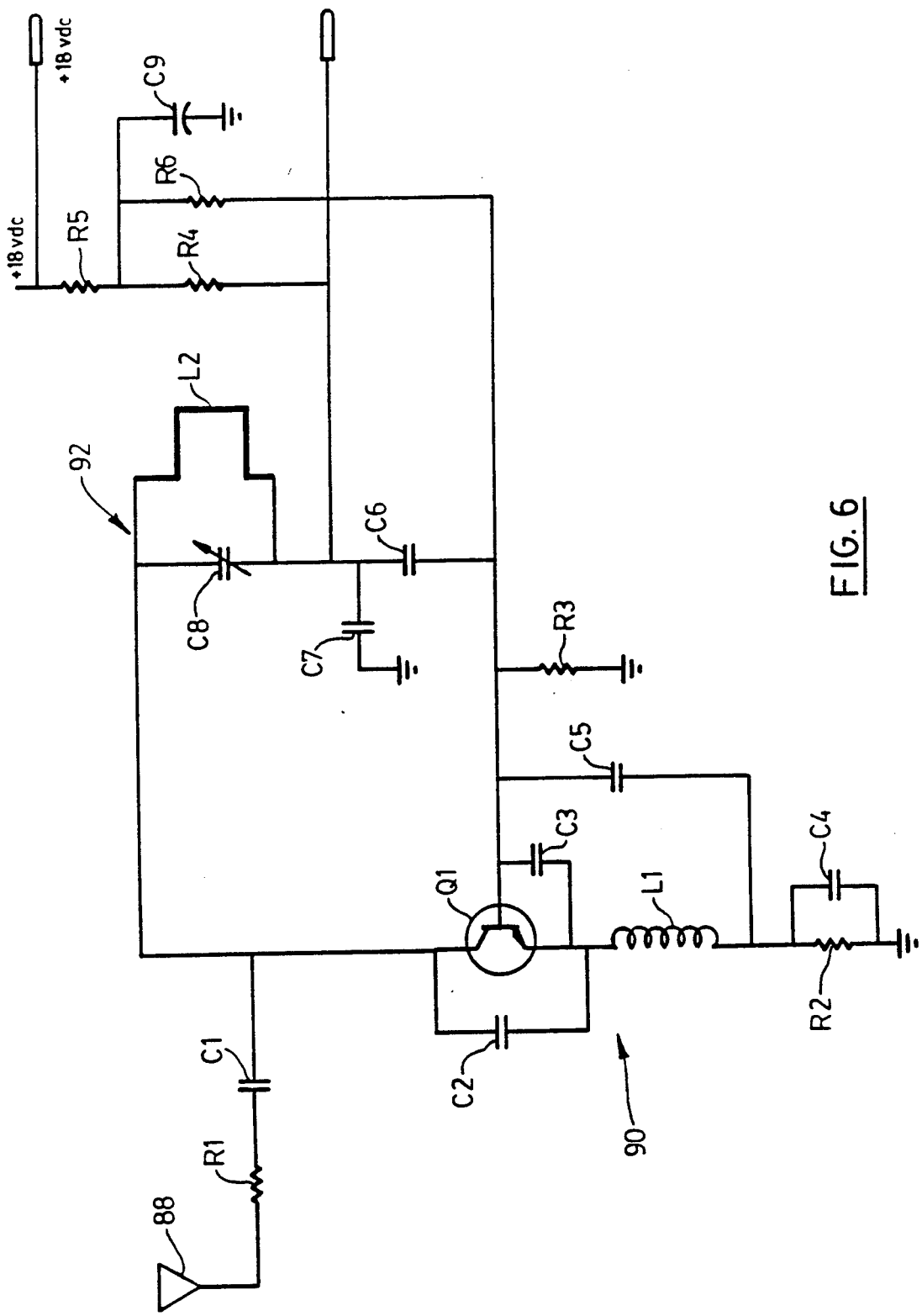
FIG. 6 is a circuit diagram of the radio frequency receiver, primary oscillator, and filter circuits of the monitor.

The circuit for monitor 10 is shown in block diagram in FIG. 5. In particular, monitor 10 is comprised of a radio frequency receiver and amplifier circuit 70, for receiving the coded radio frequency signal transmitted from a transmitter unit 12 upon detecting an abnormal condition, a power regulator circuit 72 for regulating the voltage required for the components of monitor 10, a further amplification circuit and filter circuit 74, and a UART circuit 76 for converting the eight bit serial data stream received into the original eight bit parallel form of the signal as inputted to UART circuit 32 of transmitter 12. The eight bit parallel signal is then split into its original component parts, indicating which of sensors 14, 16, 18, or 20 detected an abnormal condition as well as the six bit location code, and then sent to decoders 78, and 80, 82, respectively, for interpretation by appropriate circuitry to activate display 84, indicating the type of malfunction, and display 86, indicating the location of the transmitter, thereby providing visual warnings of the abnormal condition detected and the location of the transmitter which detected such abnormal condition.

In the preferred embodiment display 84 is particularly suited to indicate which of sensors 14, 16, 18, or 20, detected the abnormal condition and shows to the operator of the tractor trailer an appropriate warning of either HEAT, PRESSURE OUTER, PRESSURE INNER, and VIBRATION; these represent conditions commonly monitored in tractor trailers. Display 86 can visually resemble a tractor trailer so that when a particular location is indicated the operator of the vehicle can immediately identify on the vehicle the location of the transmitter unit 12 which is currently transmitting.

Since monitor 10 is preferably located in the cab of a vehicle, such as a tractor trailer the power supply for monitor 10 can be met by the vehicle battery; typically a 12 to 24 volt DC power source which can be converted to 18 volts DC.

Antenna 88 picks up the coded radio frequency signal transmitted from the transmitter unit 12 detecting an abnormal condition starting with the first bit of the 8 bit code, and sends the signal received to a tuned circuit 92 for filtering out unwanted frequencies. Tuned circuit 92 is comprised of a variable tuned capacitor C8 and inductive link L2.

It can be appreciated that for the monitor to read the entire 8 bit code correctly the first bit received should alert the monitor that a signal has been transmitted; preferably the first bit should be a 1, since a 0 bit is an "absence" of a signal. If a 1 bit was not received until, for example, the third bit of the 8 bit code then the monitor will read the code incorrectly, assuming that the third bit received—the 1 bit—is the first bit of the code; the preceding 0 bits (really an "absence" of a signal) would not be detected.

To ensure that the entire code is correctly read the first bit of the 8 bit data stream outputted from UART 32 of the transmitter 12 is always 0. Upon passing through NOT-GATE, or inverted OR-GATE 62, this bit becomes 1. Therefore the first bit of the code transmitted and received by monitor 10 is 1—ensuring that monitor 10 receives all 8 bits of the data stream.

Tuned circuit 92 in only allowing the desired frequency to be received reduces the chances of outside signals interfering with the signal transmitted from a given transmitter unit 12 located on the vehicle. In particular, by providing variable tuned capacitor C8 the monitor is adaptable to be incorporated into other systems having a set of transmitters utilizing different frequencies.

Further, tuned circuit 92, in filtering out unwanted frequencies, leaves the signal received from transmitter unit 12 basically in the form of the serial data stream which was transmitted.

The signal received through antenna 88 from transmitter unit 12 is sent to primary oscillator and amplification circuit 90 which comprises transistor Q1, capacitors C2, C3, C4, and C5, and inductance L1.

Primary oscillator and amplification circuit 90 amplifies the received signal to a voltage level usable by the rest of the circuitry of monitor 10.

Figure 7:
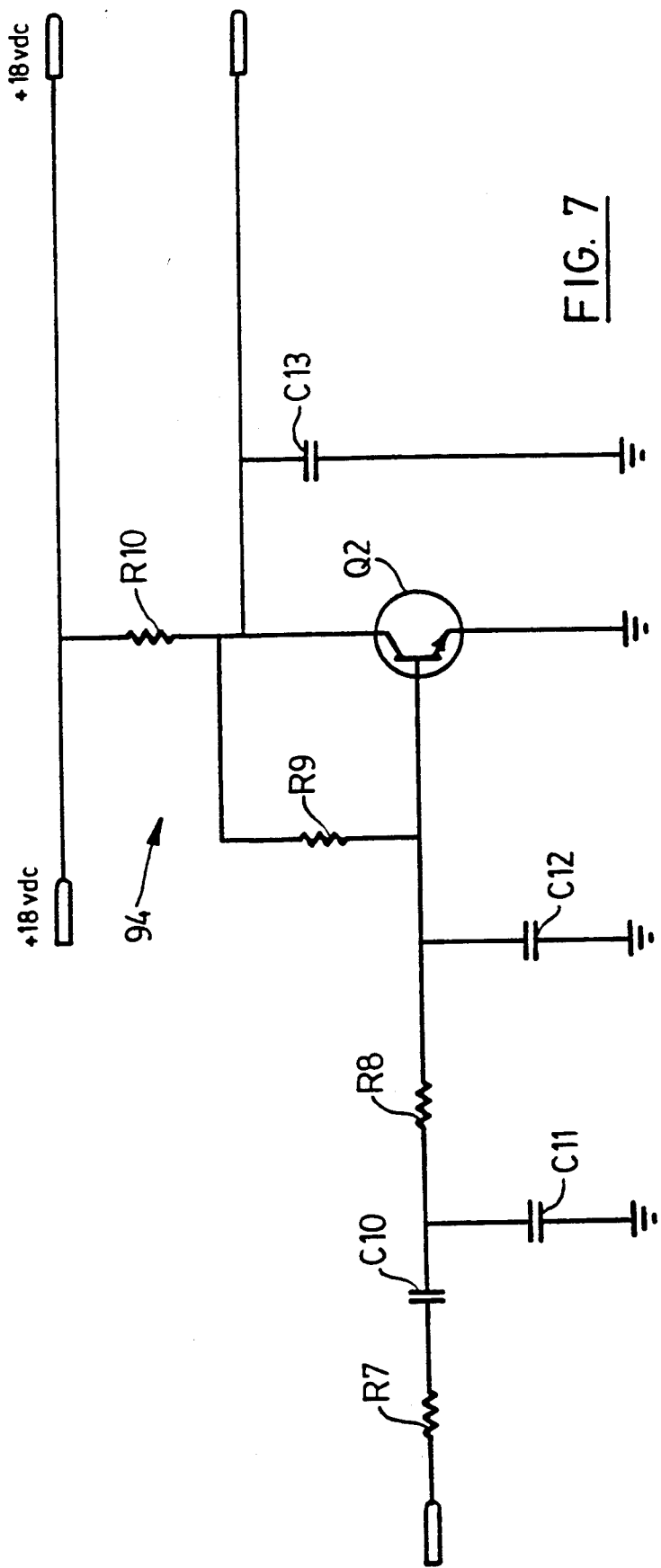
FIGS. 7 and 8 are circuit diagrams of amplifiers, filters, and the voltage regulator of the monitor of the preferred embodiment.

The amplified and filtered signal from tuned circuit 92 and primary oscillator and amplification circuit 90 is then sent to a second amplifier circuit 94, best illustrated in FIG. 7.

In second amplifier circuit 94 the signal is further filtered through use of capacitors C11 and C12 and again amplified through use of transistor Q2.

Figure 8:
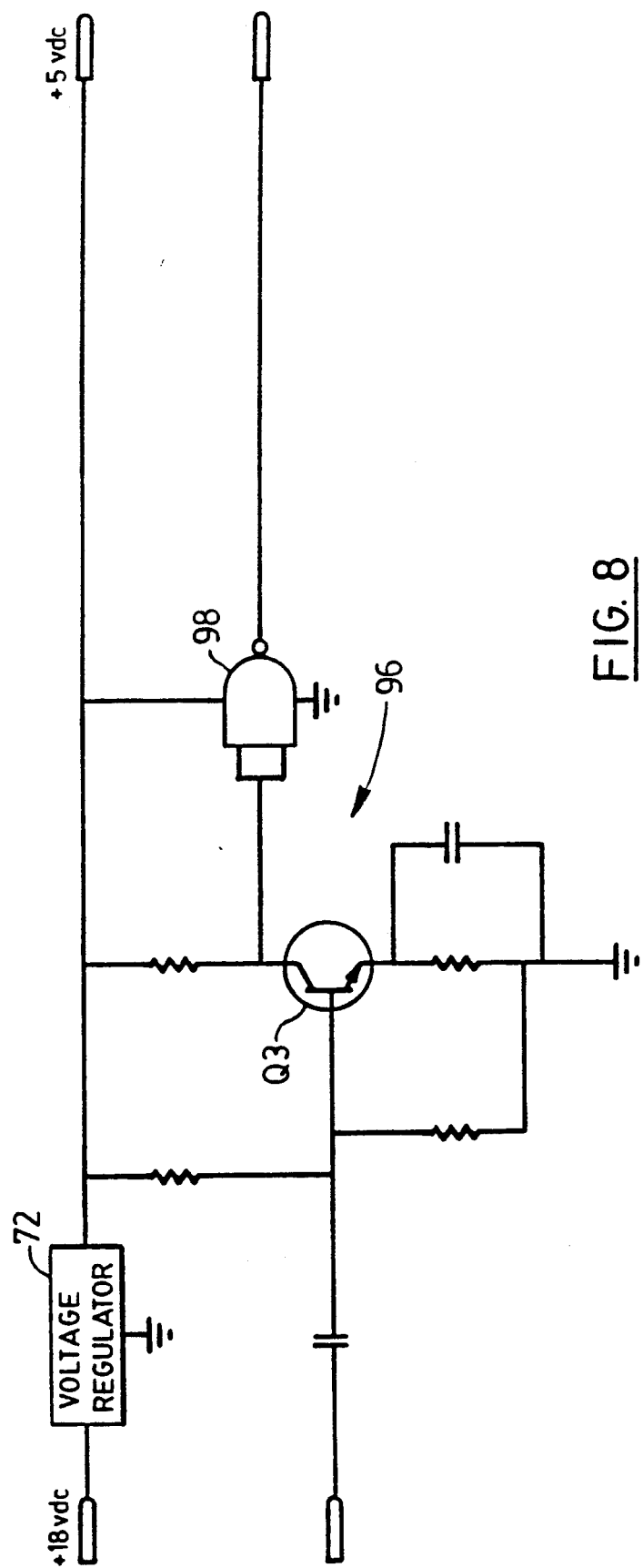

The amplified signal is then sent to a further amplification circuit 96, as best illustrated in FIG. 8. The signal is again amplified through use of transistor Q3 so that it now is of sufficient voltage to be read by UART circuit 76, which is identical to UART circuit 32 of transmitter unit 12, and, in the preferred embodiment, consists of integrated circuit IM6403-1IPL. Before the signal is sent to the UART circuit 76, however, it is first inverted by an inverted AND-GATE 98 which converts the serial data stream to the original form outputted by UART circuit 32 of transmitter unit 12, before such data stream was inverted by NOT-GATE or inverted OR-GATE 62. Upon passing through amplifier 96 and inverted AND-GATE 98 the serial data stream received is now substantially identical to that outputted by UART circuit 32 of transmitter unit 12 and is ready to be sent to UART circuit 76, of monitor 10.

Voltage regulator 72 is also illustrated in FIG. 8, and reduces the power supply from 18 volts DC to 5 volts DC which is utilized in powering UART circuit 76 of monitor 10.

Figure 9:
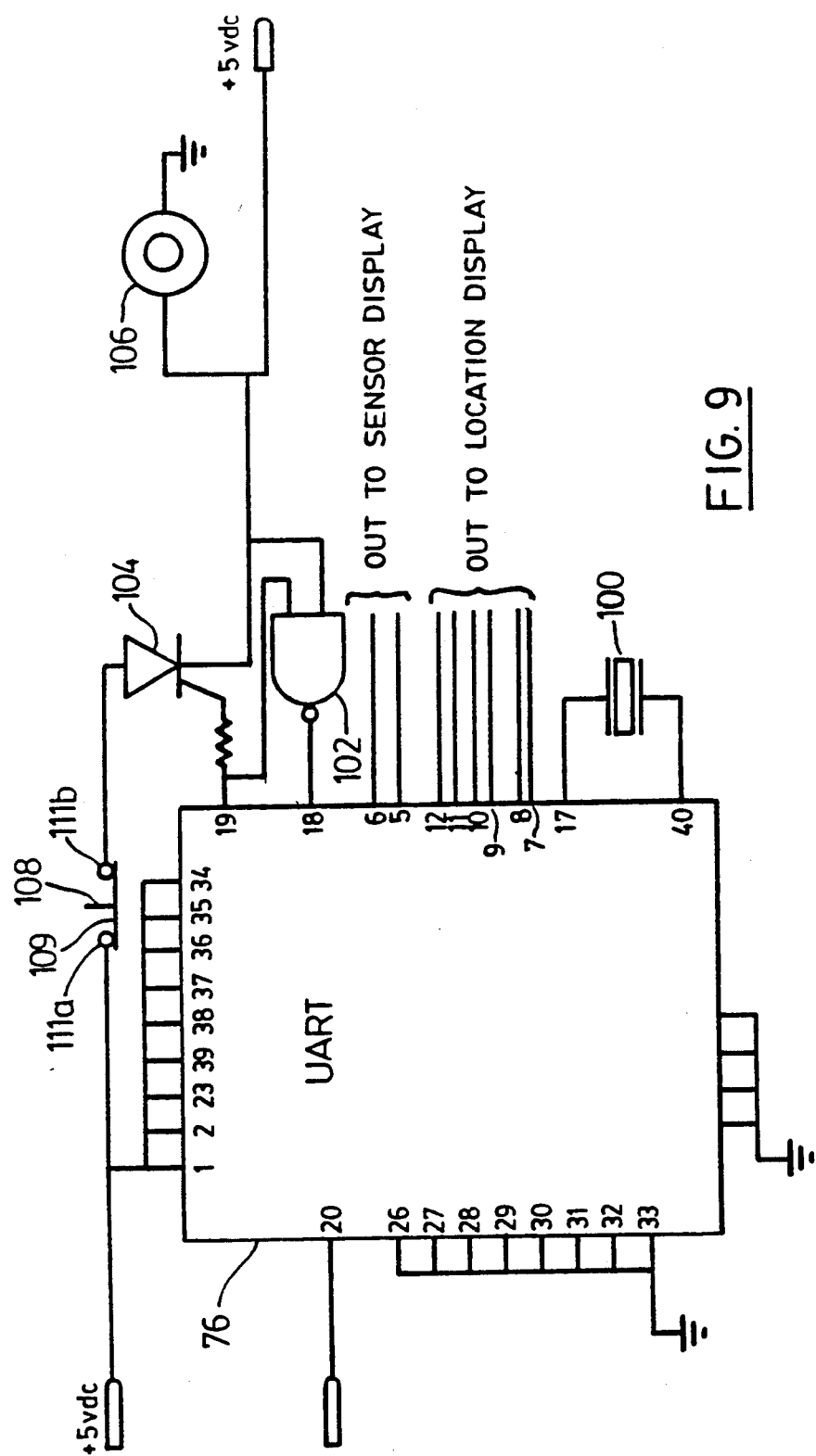
FIG. 9 is a circuit diagram of the decoding means of the monitor.

The amplified and filtered signal is then sent to UART circuit 76, which is best illustrated in FIG. 9. Particularly, the serial data stream received, filtered, amplified, and inverted, is passed through serial in port 20 of UART circuit 76 and when the entire eight bit data stream has been received pin 19 outputs a signal to one of the two inputs of inverted AND-GATE 102 as well as activates silicon control rectifier 104. Inverted AND-GATE 102 then combines the input from pin 19 of UART circuit 7 with a 5 volt DC signal from silicon control rectifier 104. When both inputs to inverted AND-GATE 102 are high the output of inverted AND-GATE 102 goes low driving pin 18 of UART circuit 76 low allowing UART circuit 76 to load another eight bits of data received UART circuit 76 is timed preferably by a 1 megahertz crystal oscillator 100 which is connected to pins 17 and 40 of UART circuit 76.

Further, when silicon controlled rectifier 104 is activated through a signal being outputted by pin 19 of UART circuit 76, silicon controlled rectifier 104, in addition to providing a 5 volt DC output to the second input of inverted AND-GATE 102, also sends the 5 volt DC power supply to decoders 78, and 80, 82, displays 84, 86, and to audio alarm 106 for producing an audible warning tone which can only be shut off by pressing reset plunger 108 displacing contact 109 away from leads 111a, 111b and thereby breaking the circuit.

UART circuit 76 on monitor 10 converts the serial data stream inputted to pin 20 from serial form to parallel form which is outputted in parallel form through pins 6, 5, and 12, 11, 10, 9, 8, and 7, respectively. The two bit sensor data indicating which of sensors 14, 16, 18, or 20 of transmitter unit 12 detected a malfunction is sent through pins 6, 5 to decoder 78, such as an integrated circuit chip 74LS138, which activates a visual display 110, comprised of 4 LED's, one for each of sensor 14, 16, 18, and 20, respectively, of transmitter unit 12.

It is to be understood that by appropriately matching each of the four LED's of visual display 110 to a specific sensor, such as outer tire pressure sensor 14, inner tire pressure sensor 16, heat sensor 18, and vibration sensor 20, of transmitter unit 12, an appropriate visual display can be provided of the detected abnormality.

Similarly, the six bit location data, converted to parallel output by UART circuit 76, is sent through pins 12, 11, 10, 9, 8, and 7, to decoder 80, such as an integrated circuit chip 74154, and decoder 82, such as an integrated chip 74LS138. In particular, decoder 80 receives four bits of the six bits of location data and decodes them so that one output of sixteen possible outputs is affected. Similarly, decoder 82 receives the remaining two bits of the six bits of location data and decodes them so that one output of four possible outputs is affected. The outputs from decoder 80 and decoder 82 are combined in display 86 which comprises an LED matrix so that one of 64 possible transmitter locations is displayed.

The specifications of the various resistors, capacitors, inductances, and transistors, as utilized in the preferred embodiment for monitor 10 are listed in the following table, however, it should be realized that these are by no means the only values acceptable to meet governmental regulations nor is the invention limited to the particular receiving means, decoding means, timing means, and display means disclosed.

| COMPONENTS | SPECIFICATIONS |
| --- | --- |
| R1 | 1K 1/4 watt 5% |
| R2 | 1K5 1/4 watt 5% |
| R3 | 4K7 1/4 watt 5% |
| R4 | 6K2 1/4 watt 5% |
| R5 | 750 Ohm 1/4 watt 5% |
| R6 | 47K 1/4 watt 5% |
| R7 | 10K 1/4 watt 5% |
| R8 | 1K 1/4 watt 5% |
| R9 | 220K 1/4 watt 5% |
| R10 | 5K6 1/4 watt 5% |
| R11 | 91K 1/4 watt 5% |
| R12 | 13K 1/4 watt 5% |
| R13 | 2K2 1/4 watt 5% |
| R14 | 330 Ohm 1/4 watt 5% |
| R15 | 3K3 1/4 watt 5% |
| R16 | 330 Ohm 1/4 watt 5% |
| R30 | 470 Ohm 1/4 watt 5% |
| C1-3 | 2pf +/− .2 pf ceramic disk |
| C4,6 | 33pf +/− 5% |
| C5 | .001 mf +/− 10% |
| C7 | 100pf +/− 10% |

| COMPONENTS | SPECIFICATIONS |
| --- | --- |
| C8 | Variable Tuner Capacitor |
| C9 | 1 mf electrolytic |
| C10 | .01 mf ceramic disk |
| C11 | .001 mf ceramic disk |
| C12 | .022 mf ceramic disk |
| C13 | .0033 mf ceramic disk |
| C14 | .1 mf ceramic disk |
| C15 | 47 mf 160 electrolytic |
| L1 | 14 turns #22 wire |
| L2 | Inductive link |
| Q1 | PN918 |
| Q2 | 2N5210 |
| Q3 | PN2219 |
| Q4 | 2N2222 |
| SCR1 | C106B |

INSTALLATION OF THE TRANSMITTER

Figure 11:
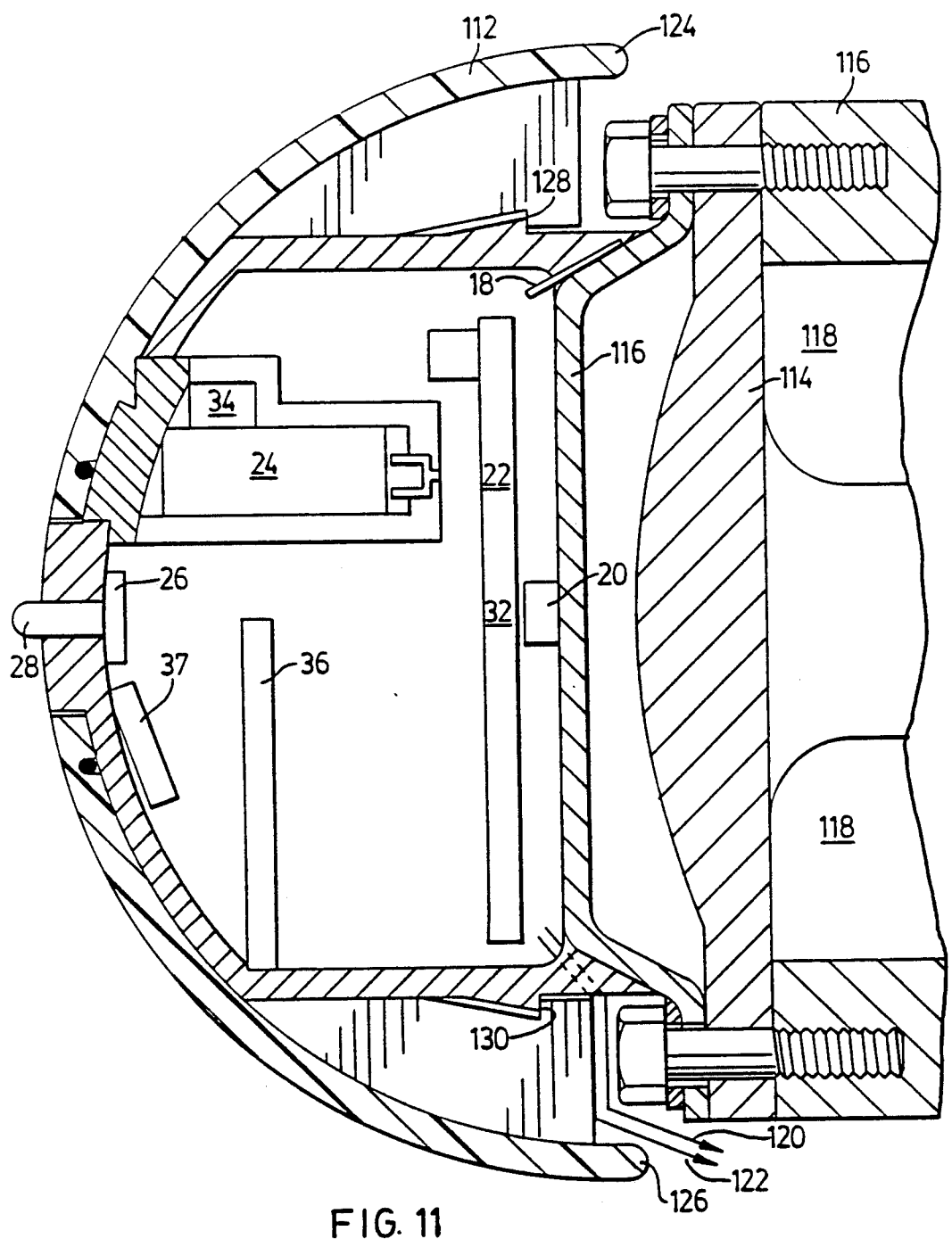
FIG. 11 is a cross-sectional view of a hub of a drive axle for the rear of a cab of a vehicle such as tractor trailer showing various components of the transmitter unit located within the hub of such axle.

FIG. 11 illustrates the placement of the component parts of the transmitter unit 12 within the drive axle of a vehicle such as a tractor trailer.

The arrangement illustrated in FIG. 11 showing the placement of the components of the transmitter unit is by no means the only arrangement used: the important consideration in placing the components of the transmitter unit 12 within the hub 112 of drive axle 114 is that they be centrifugally balanced in their positioning so as not to be damaged during rapid rotation of the drive axle.

Particularly, heat sensor 18 is placed in contact with hub 116 of drive axle 114 to detect any excessive heat generated by failing bearings 118 within hub 116. Any heat generated by failing wheel bearings 118 is rapidly transmitted to hub 116 and will readily be detected by heat sensor 18.

Vibration sensor 20 is axially located upon hub 116 of drive axle 114 and in such position can readily detect any excessive vibrations caused by worn or failed wheel bearings, a loose lug nut on the wheel, a broken steel belt in the tire, a separation of a recapped tire, or other disturbances which would give rise to excessive vibration.

Leads 120, 122 extend to outer tire pressure sensor 14 and inner tire pressure sensor 16, respectively, which would be located on the respective tires (not illustrated) of drive axle 114.

In placing of the component parts of transmitter unit 12 upon hub 116 of drive axle 114 the parts are encased in foam to reduce the chance of any accidental dislodgement from their position, and also to minimize any damage done to them should any dislodgement occur.

In installing the component parts of transmitter unit 12 hub cap 112 is removed by pulling outwardly about edges 124, 126, releasing catches 128, 130, respectively. The component parts of transmitter unit 12 can then be packed within hub cap 112 for ready attachment to hub 116 of drive axle 114.

Figure 12:
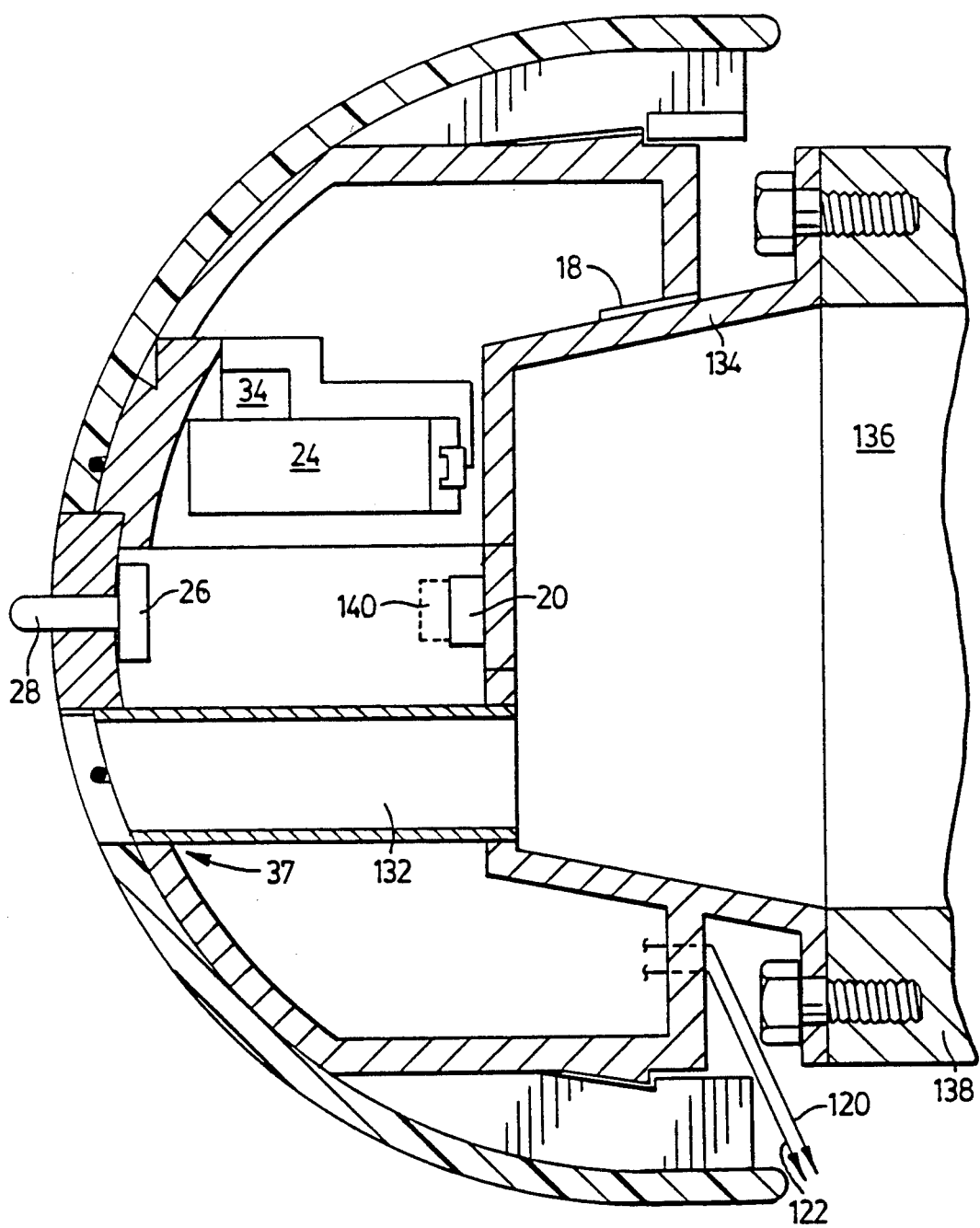
FIG. 12 is a similar view of that shown in FIG. 11 for the front axle or trailer axle of a tractor trailer.

FIG. 12 is a similar illustration to FIG. 11 showing the installation of the component parts of transmitter unit 12 within the trailer or front axle of a vehicle such as a transport trailer. The main difference in the trailer or front axle of a tractor trailer to that of the drive axle is the provision of a lubrication tube 132 in which lubrication fluid is pumped through oil cap 134 and into cavity 136 of hub 138 of the trailer or front axle.

In the case of the front axle only one tire pressure sensor is required. In this instance an additional vibration sensor 140 can be provided next adjacent to vibration sensor 20: the purpose of vibration sensor 140 is to detect momentary increases in vibration to the front wheel as a result of such wheel leaving the pavement of the normal road in the event the operator of the vehicle looses concentration while driving as occurs, for example, when the driver sleeps at the wheel.

Figure 2A:
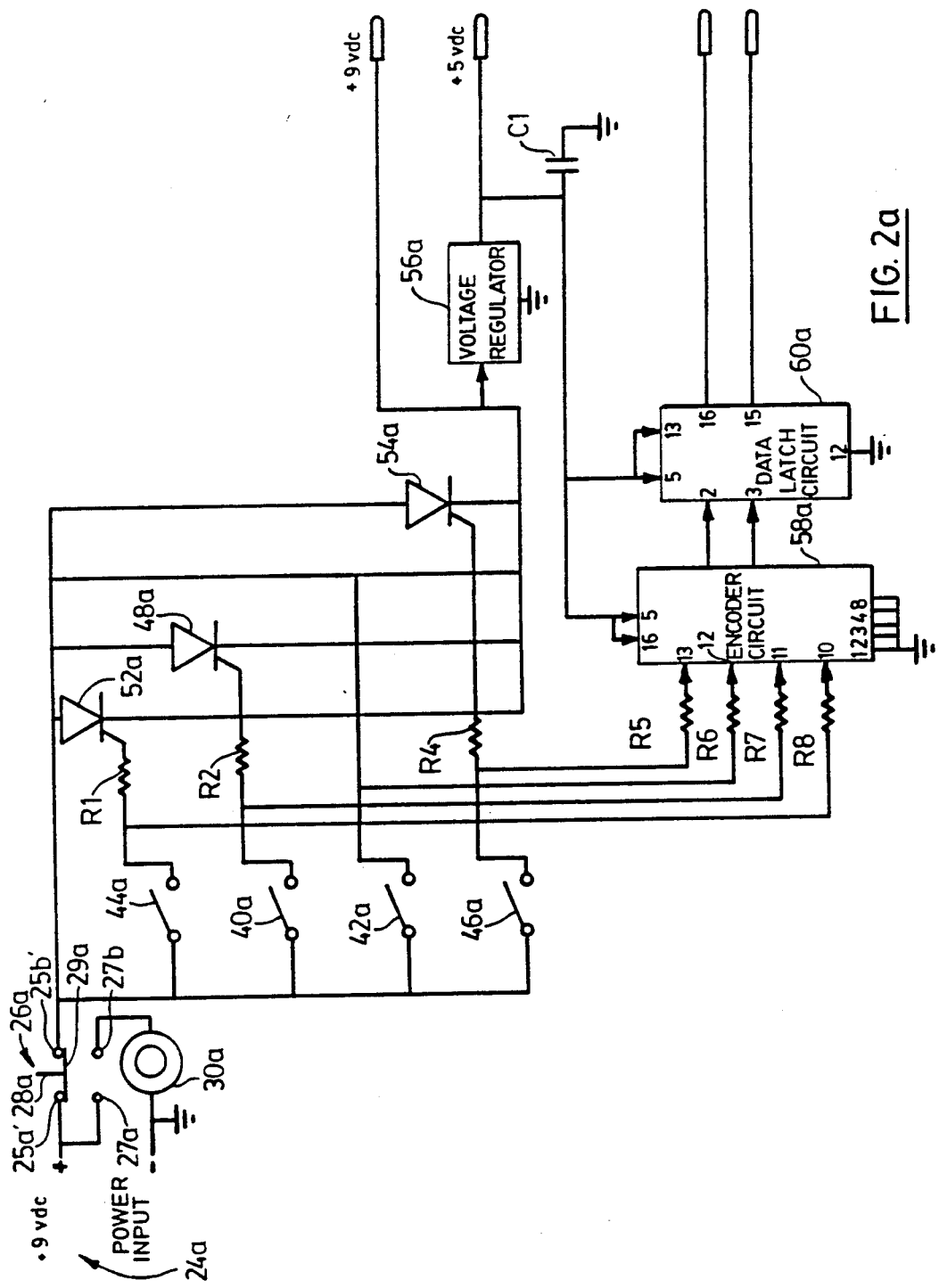
FIG. 2a is a circuit diagram of the activation circuitry of the transmitter unit of the preferred embodiment for the front wheel of a vehicle such, as a tractor trailer.

The configuration of the activation circuitry for the front wheel utilizing the additional vibration sensor 140 is illustrated in FIG. 2a wherein upon activation of vibration sensor 140 switch 42a closes providing power to voltage regulator 56a and a signal to encoder circuit 58a for transmission to data latch circuit 60a. The signal detected by vibration sensor 140 is encoded and transmitted in the regular manner as hereinbefore described except upon returning of the front wheel to normal pavement ceasing the temporary abnormal vibration detected switch 42a of vibration sensor 140 opens breaking the circuit and stopping the power supply to voltage regulator 56a and ultimately encoder circuit 58a and data latch circuit 60a. In this manner vibration sensor 140 operates differently from the other sensing means in that once the abnormal condition which activates the sensor ceases to exist the transmitter stops transmitting a coded radio frequency signal. This is desirable since upon returning the vehicle to normal pavement the operator of a vehicle does not have to stop the vehicle to manually reset the transmitter unit; rather, upon being alerted to his lack of concentration the operator through replacing the vehicle on the appropriately paved surface will "reset" the transmitter unit.

In the instance where an additional vibration sensor 140 is provided upon the front axle of the vehicle such as a tractor trailer an additional indication can be provided to monitor 10 in the cab of the vehicle alerting the driver of the particular problem of losing concentration at the wheel of the vehicle. Particularly, an audible warning circuit 142 is provided as shown in dotted outline in FIG. 10 and consists of an audible buzzer 144 having a different tone to audible buzzer 106. Audible buzzer 144 is connected through NAND-GATE 146 and inverters 148, 150, respectively, to lead 152 from decoder 78 and lead 154 from decoder 80. Therefore, upon activation of vibration sensor 140, and upon picking up the appropriate coded signal and decoding same decoders 78 and 80 upon providing appropriate signals through leads 152 and 154, respectively, energizes audible buzzer 144 alerting the operator of the vehicle to the drifting of the tractor trailer off the main pavement.

To discontinue the audible tone heard by buzzer 144 the operator of the vehicle presses reset plunger 108 displacing contact 109 from its normal position and breaking the circuit—all as in the manner described hereinbefore.

It can appreciated that with modifications to the sensors that the monitor can efficiently sense any abnormal conditions which could appear for example, in a refrigeration power plant of a refrigeration van or trailer, or alternatively, could monitor the conditions in vans or trailers covering such things as live stock or perishable goods.

Other sensors could be provided to monitor things such as oil pressure for diesel power sources, overheating of such power sources, or, as in the case of refrigeration units discussed above, freon pressure.

Further, sensors such as ultra-sound devices could be utilized to detect shifting loads in tractor trailers alerting the operator of the vehicle should such a condition arise. According to the second embodiment of the invention illustrated in FIGS. 13 to 21, inclusive, a typical alarm system of the type under consideration, particularly for vehicles such as a tractor trailer, includes a monitor 10 (all references to the same elements between the first and second embodiments are designated by like reference characters), located in the cab of the vehicle, for receiving a coded radio frequency signal, and at least one transmitter unit 12 and associated sensors for transmitting such coded radio frequency signal upon detecting an abnormal condition such as low tire pressure, excessive heat generated by failing wheel bearings, locked or over heated brakes, or abnormal conditions caused by other malfunctions resulting in excessive heat, and also excessive vibrations caused by a wheel bearing, loose lug nut on the wheel, a broken steel belt in the tire, a separation of a recapped tire, or other disturbances which would give rise to excessive vibrations. Detection by any sensor of an abnormal condition activates transmitter unit 12 to transmit a coded radio frequency signal lying within the appropriate governmental specifications, and preferably at approximately 20 KHz, for reception by monitor 10. Monitor 10, upon receiving the signal from transmitter unit 12, decodes same, as hereinafter explained, and through appropriate audio and visual indications, alerts the operator of the vehicle to the problem detected.

Figure 13:
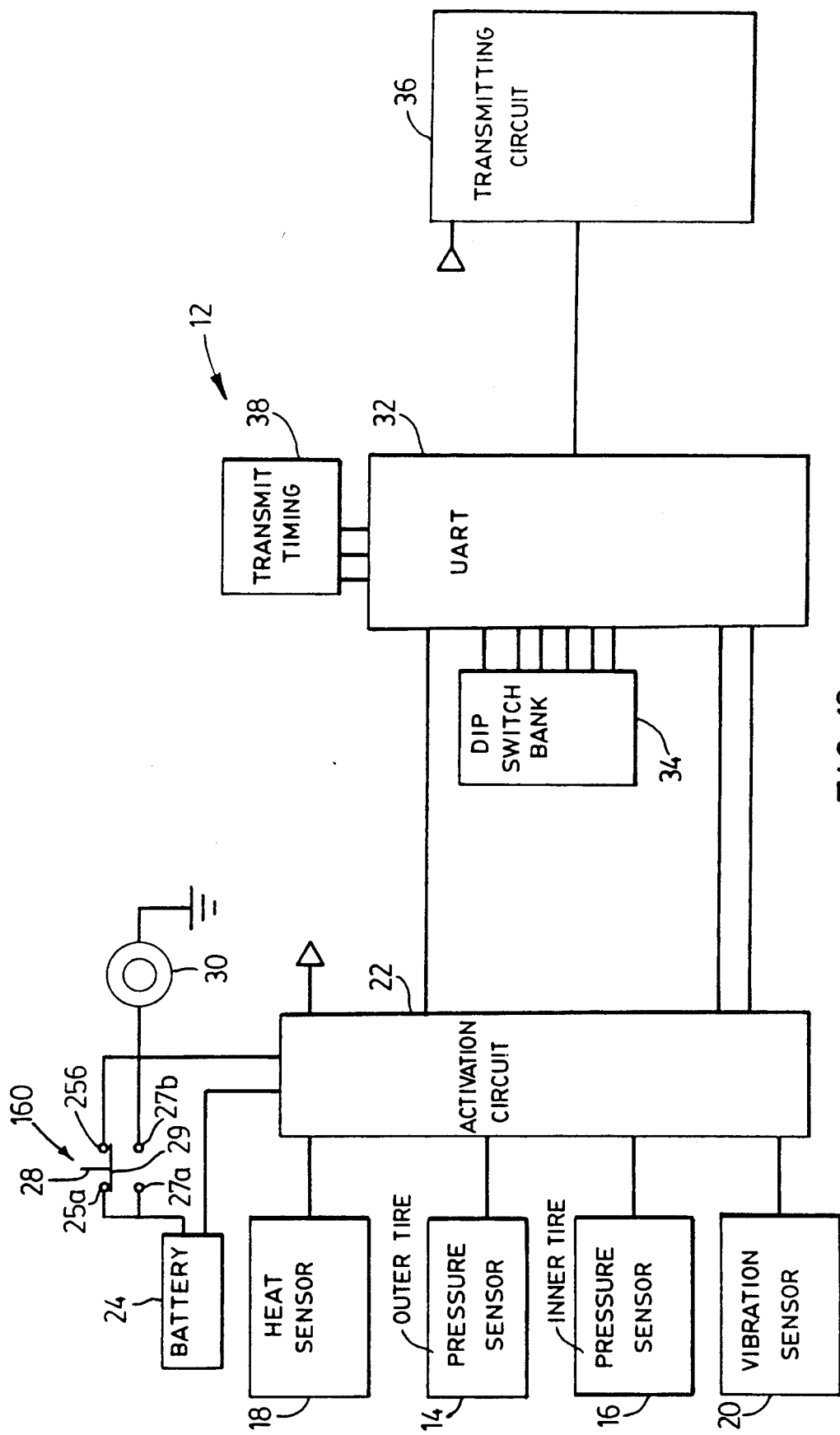
FIG. 13 is a block diagram of a second embodiment of the transmitter unit of the invention.

In the second embodiment transmitter 12, as best illustrated in block diagram in FIG. 13, comprises sensor means for detecting low tire pressure (outer and inner tire pressure sensors 14, 16, respectively), excessive heat (heat sensor 18) or vibration (vibration sensor 20) in the wheel and associated wheel bearings of the vehicle, such as a tractor trailer, and means 22 for activating transmitter unit 12 upon detection of an abnormal condition.

The transmitter includes a 9 volt dc power supply 24 and a means 160 for testing the power level of battery 24 through depressing plunger 28 and displacing contact 29 from a first position completing the circuit between leads 25a and 25b to a second position completing the circuit between leads 27a and 27b; an audible buzzer 30 is heard upon depressing plunger 28 and displacing contact 29 to the second position if 9 volt DC power supply 24 has sufficient charge—indicating successful testing of the power supply. Testing means 160 is also used as a reset switch turning the transmitter unit "off" by breaking the circuit upon displacing contact 29 from the first position between leads 25a and 25b.

Upon activation of the transmitter unit after the sensors have detected an abnormal condition a signal is sent from activation circuitry 22 indicating which of sensors 14, 16, 18, or 20, has detected an abnormal condition to a Universal Asynchronous Receiver/Transmitter (UART) circuit 32, such as, in the second embodiment an integrated circuit IM6402IPL. UART circuit 32 combines the sensor code received from activation circuit 22 with a location code received from dip switch assembly 34 indicating the location of the particular transmitter unit detecting the abnormal condition and sends the combined coded signal to transmitting circuit 36 where the signal is transmitted as a coded radio frequency signal to be picked up by monitor 10 located, preferably in the cab of the vehicle such as tractor trailer: the timing of the transmissions from the transmitting circuit 36 is controlled by timing circuit 38.

Figure 14:
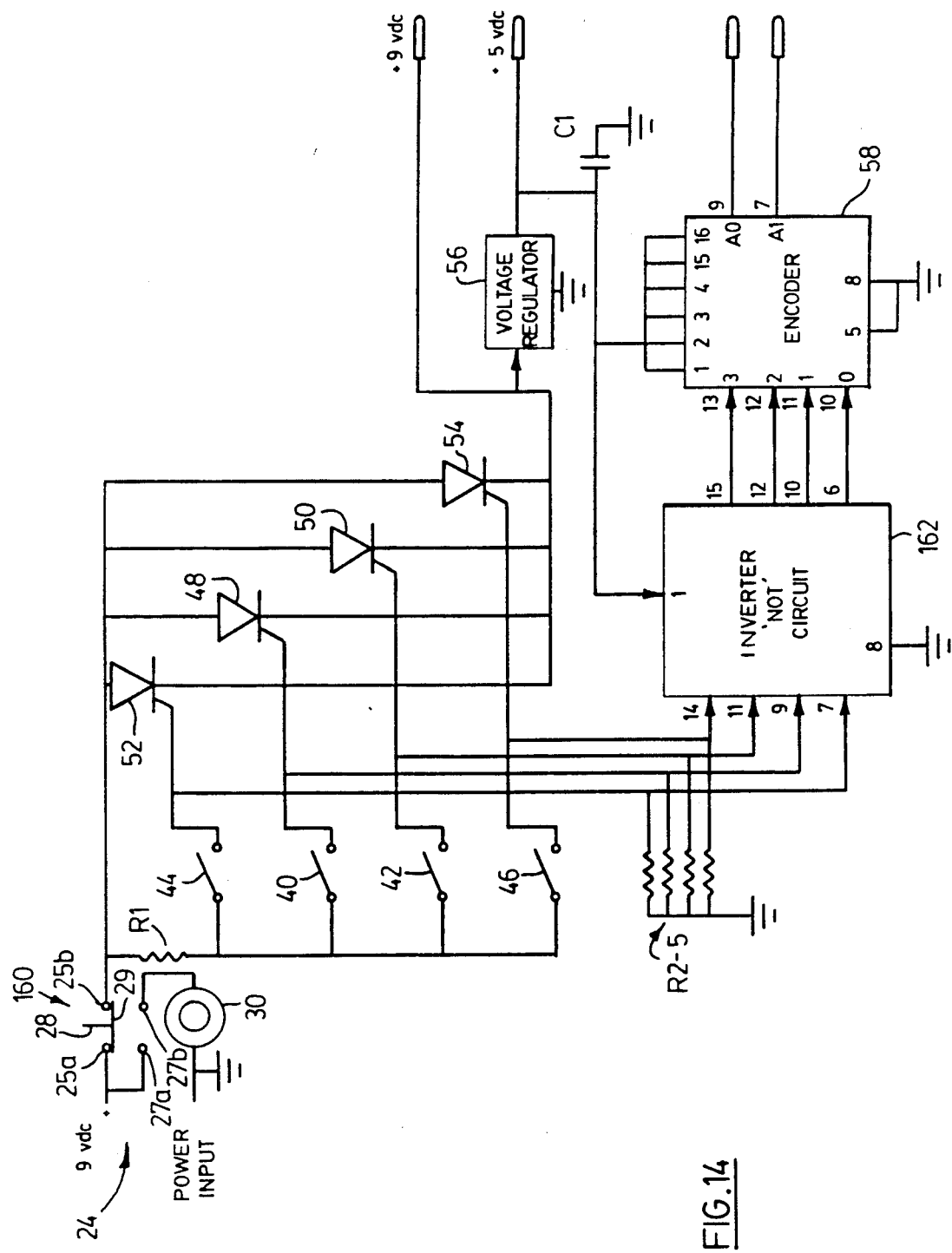
FIG. 14 is a circuit diagram of the activation circuitry of the transmitter unit of the second embodiment illustrated in FIG. 13.
Figure 14A:
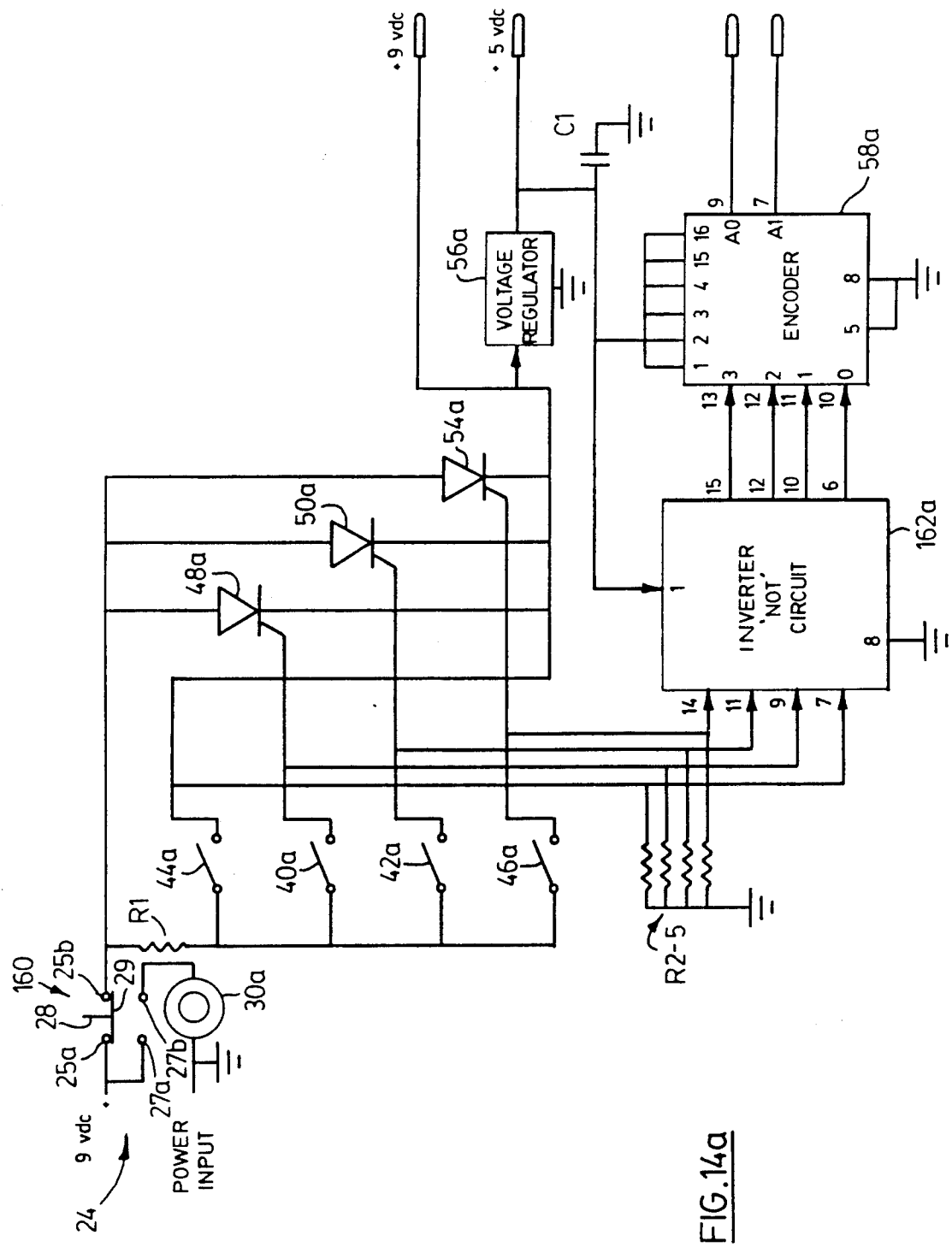
FIG. 14a is a circuit diagram of the activation circuitry of the transmitter unit of the second embodiment illustrated in FIG. 13 for the front wheel of a vehicle such as a tractor trailer.

Sensors 14, 16, 18, and 20, and activation circuit 22 of the second embodiment are detailed in FIG. 14. Particularly, sensors 14, 16, 18, and 20, comprise switches 40, 42, 44, and 36, respectively, and associated silicon controlled rectifiers 48, 50, 52, and 54, respectively. Upon detecting an abnormal condition the appropriate sensor 14, 16, 18, or 20, closes its respective switch 40, 42, 44, or 46 enabling corresponding silicon controlled rectifier 48, 50, 52, or 54, to pass 9 volts dc from power supply 24 to voltage regulator circuit 56 which reduced the 9 volt power supply to 5 volts for use by UART circuit 32. Again, since silicon controlled rectifiers 48, 50, 52, and 54, are in parallel, activation of any one sensor supplies the 9 volt power supply to voltage regulator 56.

Further, the reduced power supply of 5 volts dc from voltage regulator circuit 56 is used to power encoder circuit 58, such as integrated circuit 74148, together with data inverter circuit 162, such as, in the second embodiment, integrated inverter circuit 4049.

Upon closing any one of switches 40, 42, 44 or 46 a 9 volt signal is supplied to the respective pins 9, 11, 7 or 14 of inverter circuit 162. Therefore the silicon controlled rectifier gates supply four bits of parallel data in the form of the presence or absence of a voltage produced by the closing or remaining open of respective switches 40, 42, 44 or 46 upon detection of an abnormal condition from associated sensors 14, 16, 18, and 20, respectively. Encoder circuit 58 encodes the four bits of inverted data into two bits of information, which are in turn sent to UART circuit 32.

For example, should swatch 44 of sensor 18 be activated its corresponding line into encoder circuit 58 after passing through inverter circuit 162 would be supplied with 0 volts DC from power supply 24. The remaining lines from switches 40, 42, and 46, are high, i.e. 9 volts DC, after passing through inverter circuit 162. These inputs represent the four bits of data which are encoded, namely, in this example reading in the order of pins 13, 12, 11, and 10: 1110. The encoder takes these four bits of data and converts them to two bits of binary information, for example 1110 become 00. Similarly, if switch 40, of sensor 14 closes, the four bits of data supplied to encoder circuit 58 after passing through inverter circuit 162 would be represented as 1101. Encoder circuit 58 would then encode this result to the following two bit code: 01.

In the preferred embodiment the following encoding sequence is used:

| SENSOR | FOUR BIT DATA INPUT | TWO BIT DATA OUTPUT |
|---|---|---|
| 18 | 1110 | 00 |
| 14 | 1101 | 01 |
| 16 | 1011 | 10 |
| 20 | 0111 | 11 |

It can be appreciated that encoder circuit 58a, in the second embodiment, can encode, in order of importance, the sensors if more than one sensor is activated. The sensor priority is 18, 20, 16, 14, meaning that if sensor 18 and sensor 20 are both activated, sensor 18 will be coded. Also, it can be appreciated that by using, in the second embodiment, silicon controlled rectifiers 48, 50, 52 and 54, the first activation of any sensor will power the transmitter. If the initial abnormality which activated the particular sensor has been shut off, or is no longer present, power will remain on indefinitely until the unit is reset by depressing plunger 28 of reset switch 160 separating contact 29 from leads 25a, 25b, breaking the circuit and cancelling the power supply. Consequently, the first silicon controlled rectifier activated will continue to keep its input to encoder circuit 58 on. Further silicon controlled rectifiers activated after the first one by their corresponding sensor will shut off if the corresponding sensor shuts off. For example, if sensor 20 detects excessive vibration, the encoder circuit 58 codes sensor 20, and the transmitter operates. If the vibration stops, sensor 20 will shut off, but corresponding silicon controlled rectifier 54 will remain on, and consequently the encoder circuit 58 will still code sensor 20. Now if sensor 18 senses excessive heat, encoder circuit 58 will code sensor 18, because it has priority. If heat sensor 18 burns out, encoder circuit 58 will code sensor 20 again, until the operator resets the unit. This latching-priority method feature is particularly useful since it allows more important sensors to take priority, to demand a faster response from the operator, and even if the initial sensory data which caused the transmitter to activate is no longer present, the vehicle must be stopped, and the problem investigated.

The two bit signal from encoder circuit 58a is then sent to UART circuit 32 which combines the two bits of sensor information with a six bit location code for that particular transmitter and then converts the combined eight bit parallel signal inputted to a serial data stream for transmitting.

Figure 15:
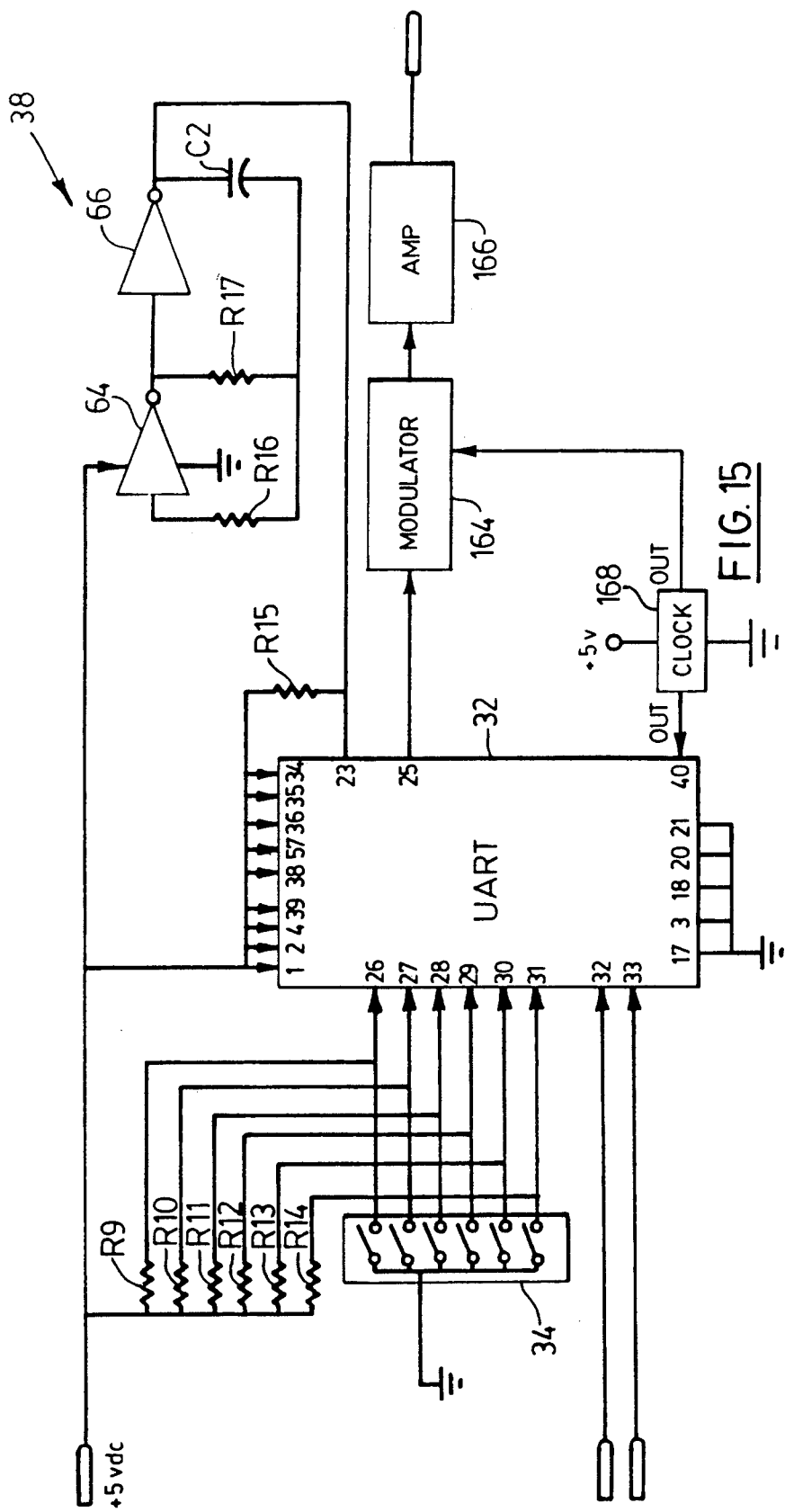
FIG. 15 is a circuit diagram of the encoding means of the second embodiment of the invention of the transmitter unit.

As best illustrated in FIG. 15 UART circuit 32 is supplied with the six bits of data relating to the location of the transmitter from dip switch assembly 34 which contains the code representing the location of the transmitter; the code being preset at the time of installation of the transmitter. By providing six bits for the code representing the location of the transmitter up to 64 different locations can be monitored on the vehicle. The two bit data from the detection circuit is combined with the six bits of data relating to location and the combined eight bits are transmitted by transmitting circuit 36 to monitor 10 indicating to the operator of the vehicle both the location of the abnormal condition detected together with the type of abnormal condition detected.

UART circuit 32 sends the eight bit serial data stream to transmitting circuit 36 through, in the second embodiment, a modulator 164 and an amplifier 166 at such a rate that the entire eight bit serial data stream is transmitted approximately twice every second. The timing of the rate of transmission is controlled by transmit timing circuit 38 which comprises two NOT-GATES 64, 66 in combination with a suitable capacitance C2, which in the second embodiment the capacitance is approximately 4.7 µf. Upon receiving power from voltage regulator 56 transmit timing circuit 38 outputs a signal to pin 23 of UART circuit 32 approximately twice a second. Upon activation of pin 23 of UART circuit 32 by transmit timing circuit 38 pin 25 of the UART circuit sends to transmitting circuit 36 through, as in the second embodiment, a modular 164 and an amplifier 166, the eight bit serial data stream.

The connections to UART circuit 32 are illustrated in FIG. 15 for the second embodiment, with the two bit data from the detection circuit being connected to pins 32, 33, and the 6 bits of data relating to location of the transmitter unit being connected to pins 26, 27, 28, 29, 30, and 31. The timing of UART circuit 32 in the second embodiment is provided by a 20 KHz clock generator 168 which is connected to pin 40 of UART circuit 32.

Figure 16:
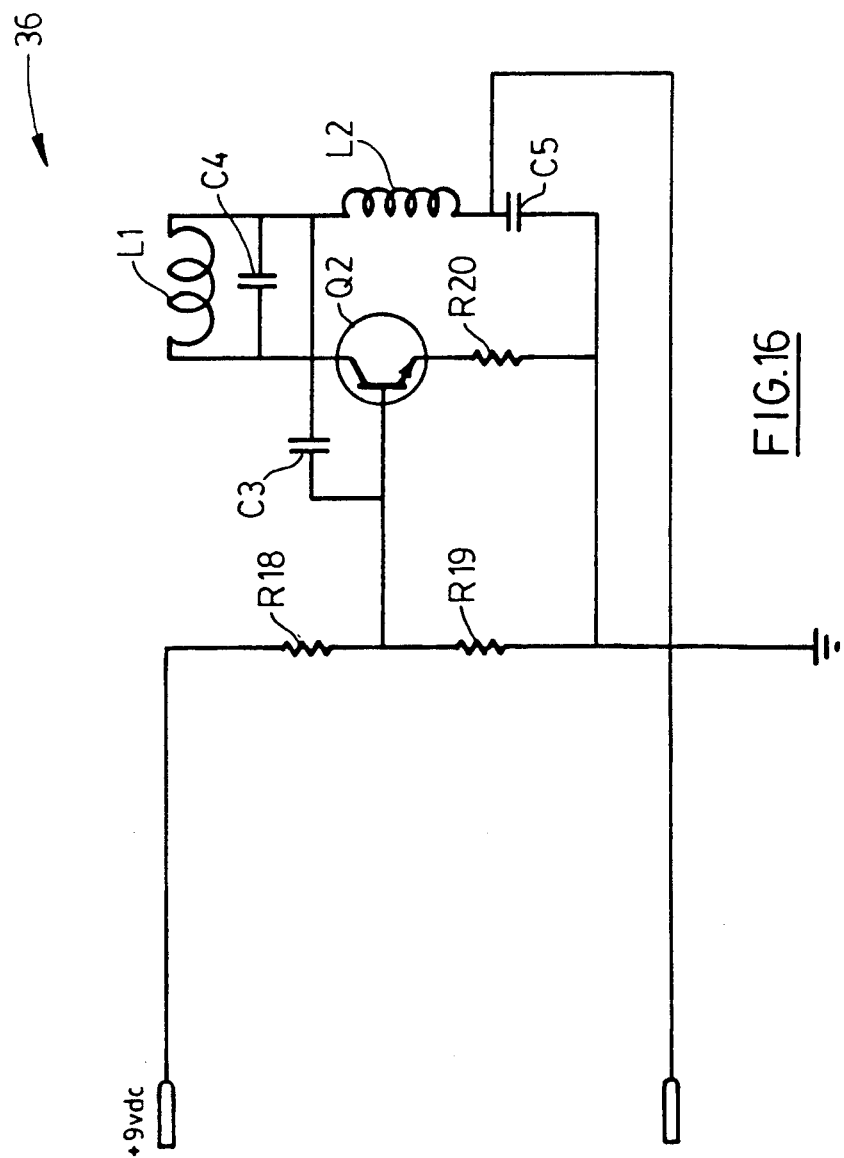
FIG. 16 is a circuit diagram of the transmitting circuit of the transmitter unit of the second embodiment of the invention.

Transmitting circuit 36 for the second embodiment is illustrated in FIG. 16. In particular, the eight bit serial data stream after modulation and amplification through modulator 164 and amplifier 166, is then transmitted at resonant frequency determined by inductance L1 and capacitance C4 for transmission as a radio frequency signal. It is noted that by appropriately choosing inductance L1 and capacitance C4 a radio frequency signal comprising the eight bit serial data stream can be generated meeting governmental regulations.

The specifications of the various resistors, capacitors, inductances, and transistors, as utilized in the second embodiment are listed in the following table, however, it should be realized that these are by no means the only values acceptable to meet governmental regulations nor is the invention limited to the particular sensing means, coding means, timing means, and transmitting circuit means disclosed.

| COMPONENTS | SPECIFICATIONS |
|---|---|
| R1, 9-15 | 3K3 1/4 watt 5% |
| R2-5 | 47K |
| R16 | 1 M |
| R17 | 100K |
| R18 | 6K2 |
| R19 | 1K5 |
| C1 | .1 µf |
| C2 | 4.7 µf electrolytic |
| C3 | 3.3 pf +/− .2 pf ceramic |
| C4 | 4.7 pf +/− .2 pf ceramic |
| C5 | 33 pf +/− 5% ceramic |
| L1 | 2 turns 2mm aluminium ferrite core |
| L2 | 14 turns #22 wire |
| Q2 | PN918 |
| SCR 1-4 | C106B |

Figure 17:
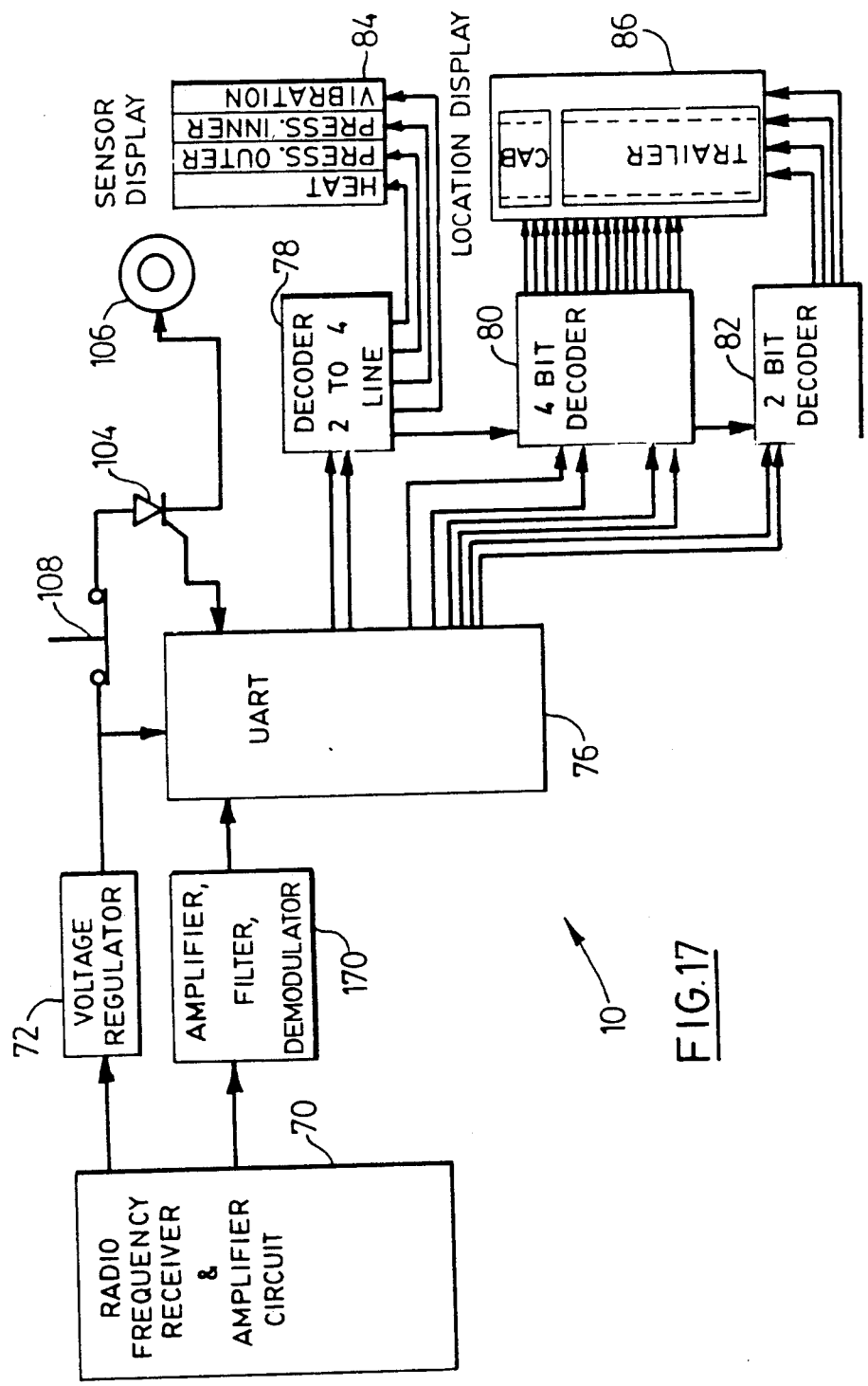
FIG. 17 is a block diagram of a second embodiment of the monitor of the invention.

The circuit for monitor 10 of the second embodiment is shown in block diagram in FIG. 17. In particular, monitor 10 is comprised of a radio frequency receiver and amplifier circuit 70, for receiving the coded radio frequency signal transmitted from a transmitter unit 12 upon detecting an abnormal condition, a power regulator circuit 72 for regulating the voltage required for the components of monitor 10, a further amplification circuit and filter and demodulator circuit 170, and a UART circuit 76 for converting the eight bit serial data stream received into the original eight bit parallel form of the signal as inputted to UART circuit 32 of transmitter 12. The eight bit parallel signal is then split into its original component parts, indicating which of sensors 14, 16, 18, or 20 detected an abnormal condition as well as the six bit location code, and then sent to decoders 78, and 80, 82, respectively, for interpretation by appropriate circuitry to activate display 84, indicating type of malfunction, and display 86, indicating the location of the transmitter, thereby, providing visual warnings of the normal condition detected and the location of the transmitter which detected such abnormal condition. Again, monitor 10 is preferably located in the cab of a vehicle, such as a tractor trailer, and the power supply for monitor 10 can be met by the vehicle battery; typically a 12 or 24 volt DC power source which can be converted to 18 volts DC.

Figure 18:
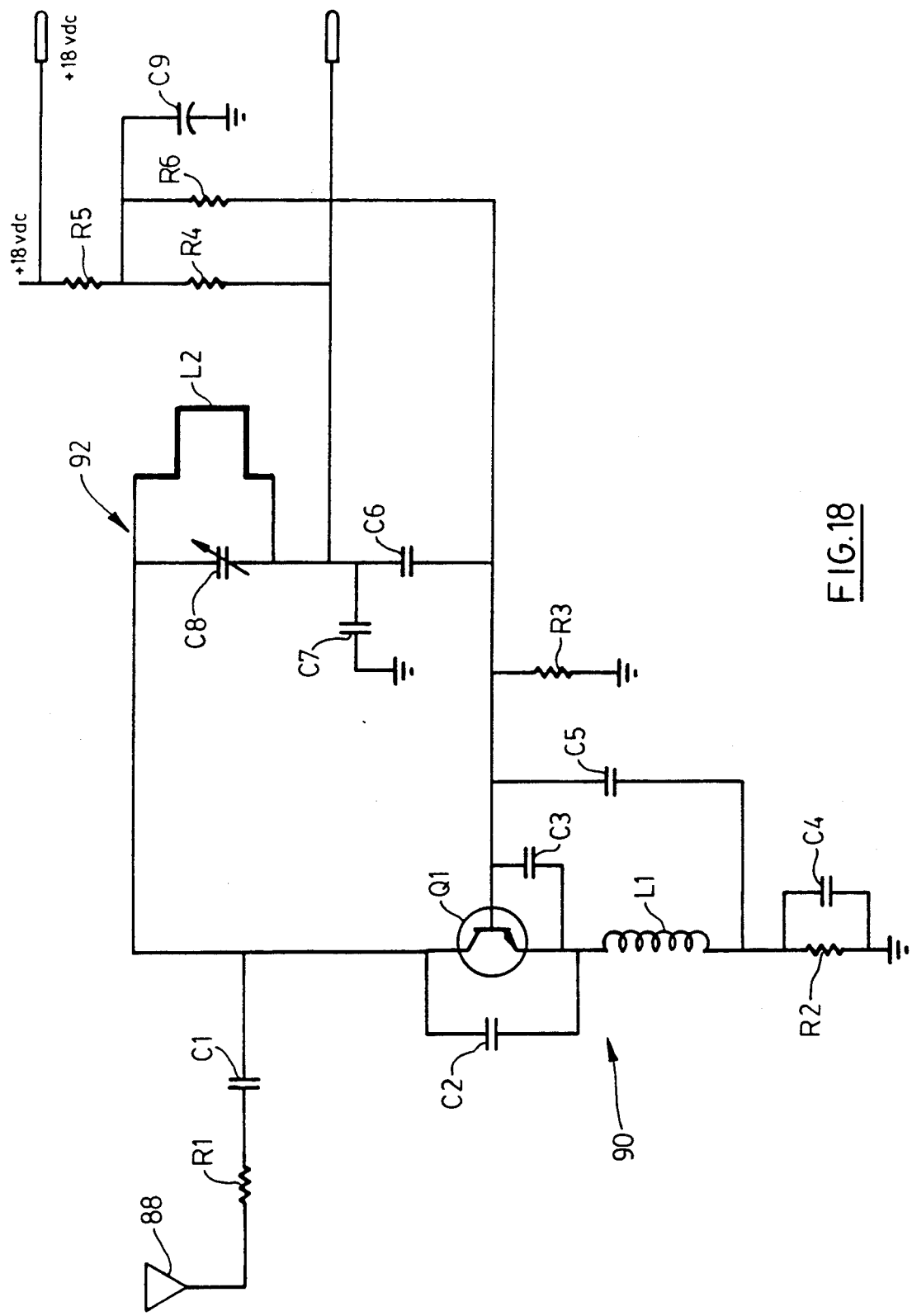
FIG. 18 is a circuit diagram of the radio frequency receiver, primary oscillator, and filter circuits of the monitor of the second embodiment illustrated in FIG. 17.
Figure 19:
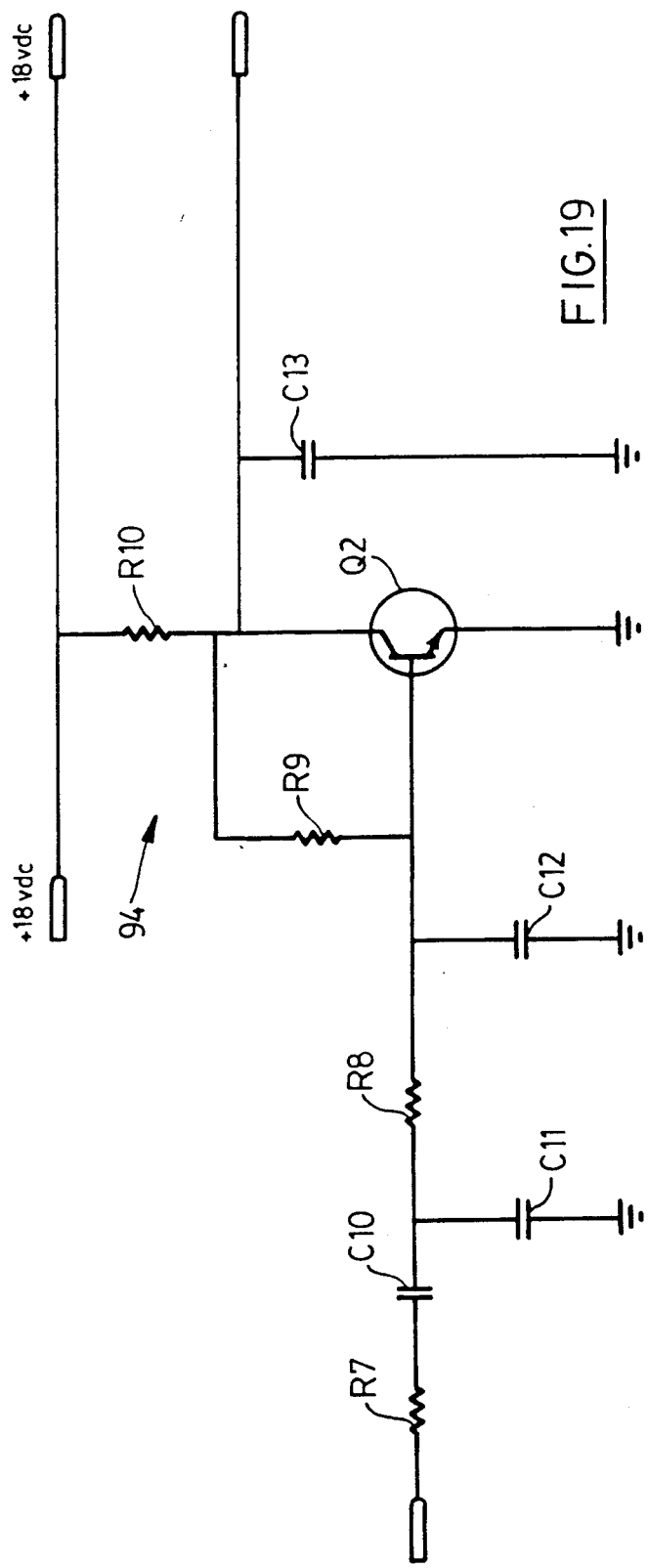
FIGS. 19 and 20 are circuit diagram of amplifiers, filters, demodulator, and the voltage regulator of the monitor of the second embodiment.

Antenna 88 picks up the coded radio frequency signal transmitted from the transmitter unit 12 detecting an abnormal condition and sends the signal received to a tuned circuit 92 for filtering out unwanted frequencies. Tuned circuit 92 is comprised of a variable tuned capacitor C8 and inductive link L2 as best illustrated in FIG. 18.

Tuned circuit 92 in only allowing the desired frequency to be received reduced the chances of outside signals interfering with the signal transmitted from a given transmitter unit 12 located on the vehicle. In particular, by providing variable tuned capacitor C8 the monitor is adaptable to be incorporated into other systems having a set of transmitters utilizing different frequencies.

Further, tuned circuit 92, in filtering out unwanted frequencies, leaves the signal received from transmitter unit 12 basically in the form of the serial data stream which was transmitted.

The signal received through antenna 88 from transmitter unit 12 is sent to primary oscillator and amplification circuit 90 which comprises transistor Q1, capacitors C2, C3, C4, and C5, and inductance L1. Primary oscillator and amplification circuit 90 amplifies the received signal to a voltage level usable by the rest of the circuitry of monitor 10. The amplified and filtered signal from tuned circuit 92 and primary oscillator and amplification circuit 90 is then sent to a second amplifier circuit 94, best illustrated in FIG. 19.

In second amplifier circuit 94 the signal is further filtered through use of capacitors C11 and C12 and again amplified through use of transistor Q2.

Figure 20:
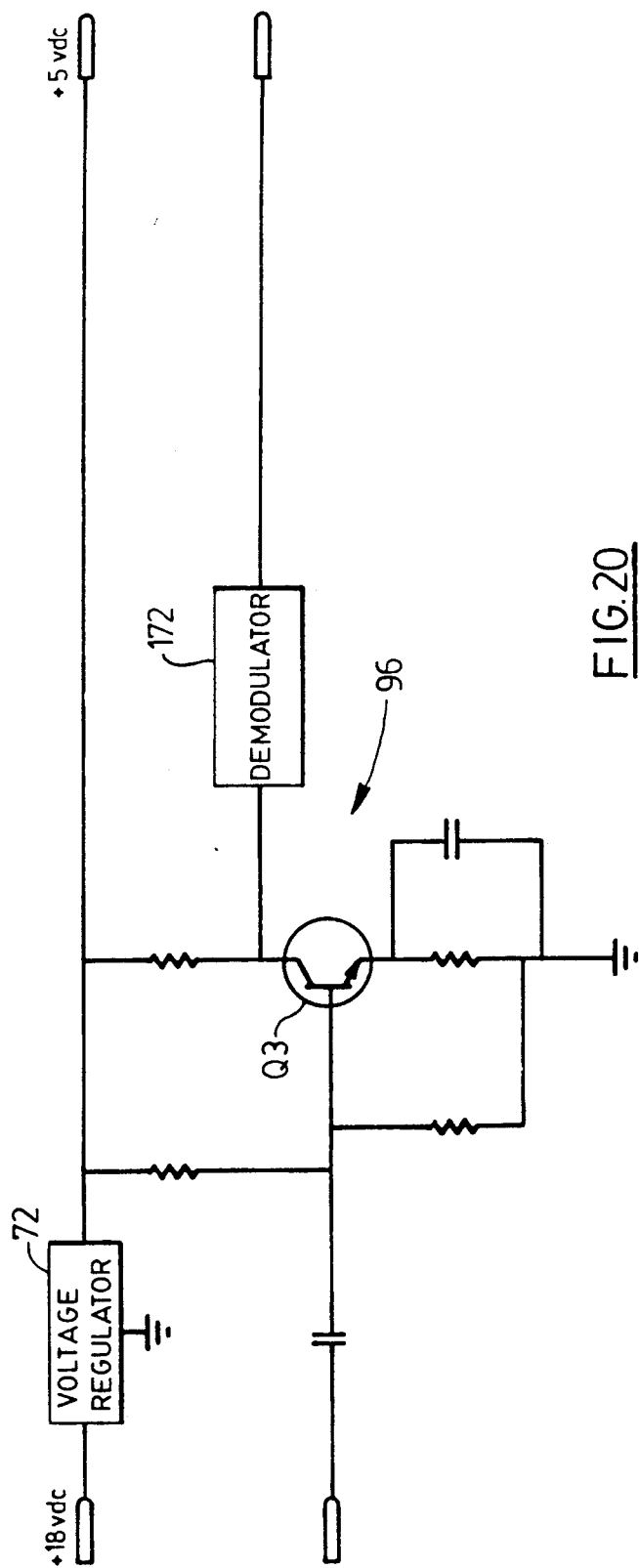

The amplified signal is then sent to a further amplification circuit 96, as best illustrated in FIG. 20. The signal is again amplified through use of transistor Q3 so that it now is of sufficient voltage to be demodulated by demodulator circuit 172. UART circuit 76, which is identical to UART circuit 32 of transmitter unit 12 but functioning oppositely to UART circuit 12, and, in the second embodiment, consists of integrated circuit IM6402IPL, receives the demodulated signal. The signal received by UART circuit 76 is in the original form outputted by UART circuit 32 of transmitter unit 12, before such data stream was modulated by modulator 164.

Voltage regulator 72 reduces the power supply from 18 volts DC to 5 volts DC which is utilized in powering UART circuit 76 of monitor 10.

Figure 21:
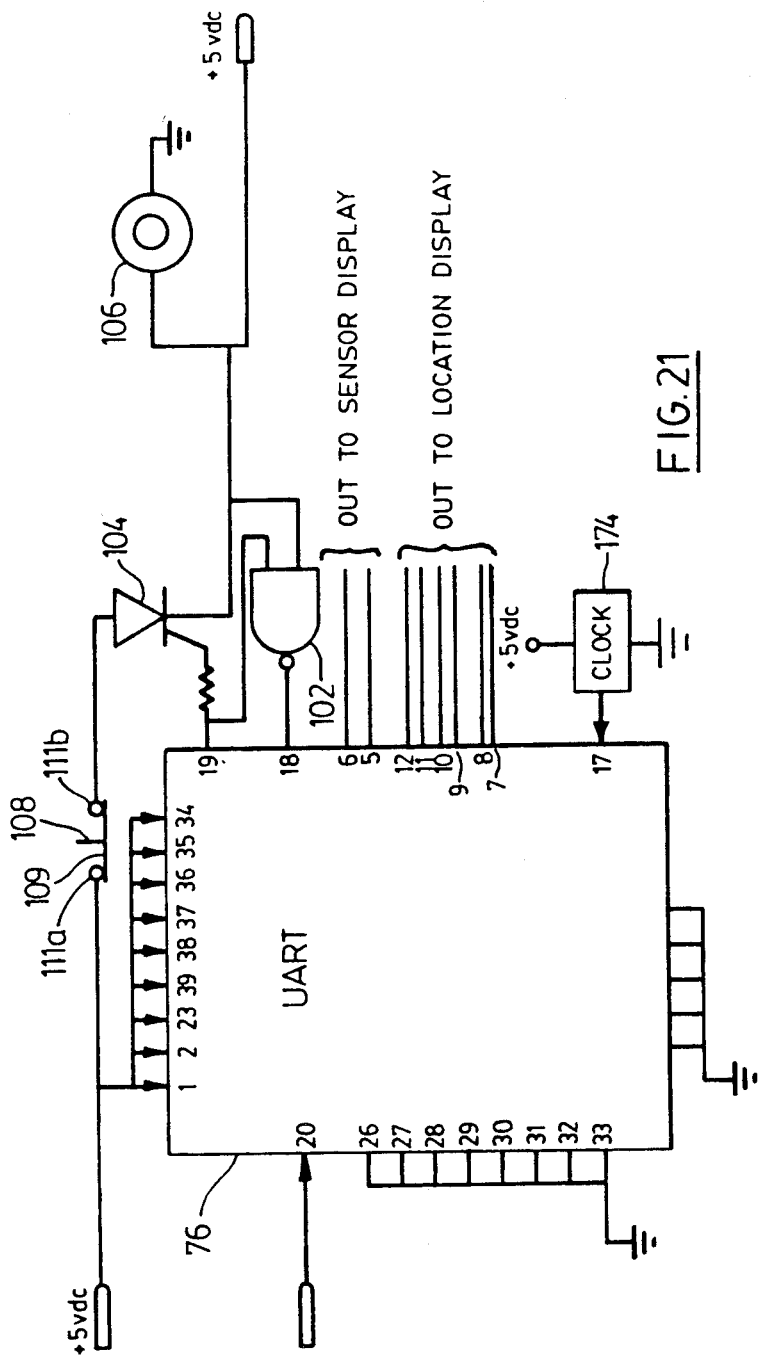
FIG. 21 is a circuit diagram of the decoding means of the monitor of the second embodiment.

The amplified, filtered, and modulated signal is then sent to UART circuit 76, which is best illustrated in FIG. 21. Particularly, the serial data stream received, filtered, amplified, and demodulated, is passed through serial-in port 20 of UART circuit 76 and when the entire eight bit data stream has been received pin 19 outputs a signal to one of the two inputs of inverted AND-GATE 102 as well as activates silicon control rectifier 104. Inverted AND-GATE 102 then combines the input from pin 19 of UART circuit 76 with a 5 volt DC signal from silicon control rectifier 104. When both inputs to inverted AND-GATE 102 are high the output of inverted AND-GATE 102 goes low driving pin 18 of UART circuit 76 low allowing UART circuit 76 to load another eight bits of data received.

UART circuit 76 of the second embodiment is timed preferably by a 20 KHz clock generator 174 which is connected to pin 17 of UART circuit 76.

Figure 10:
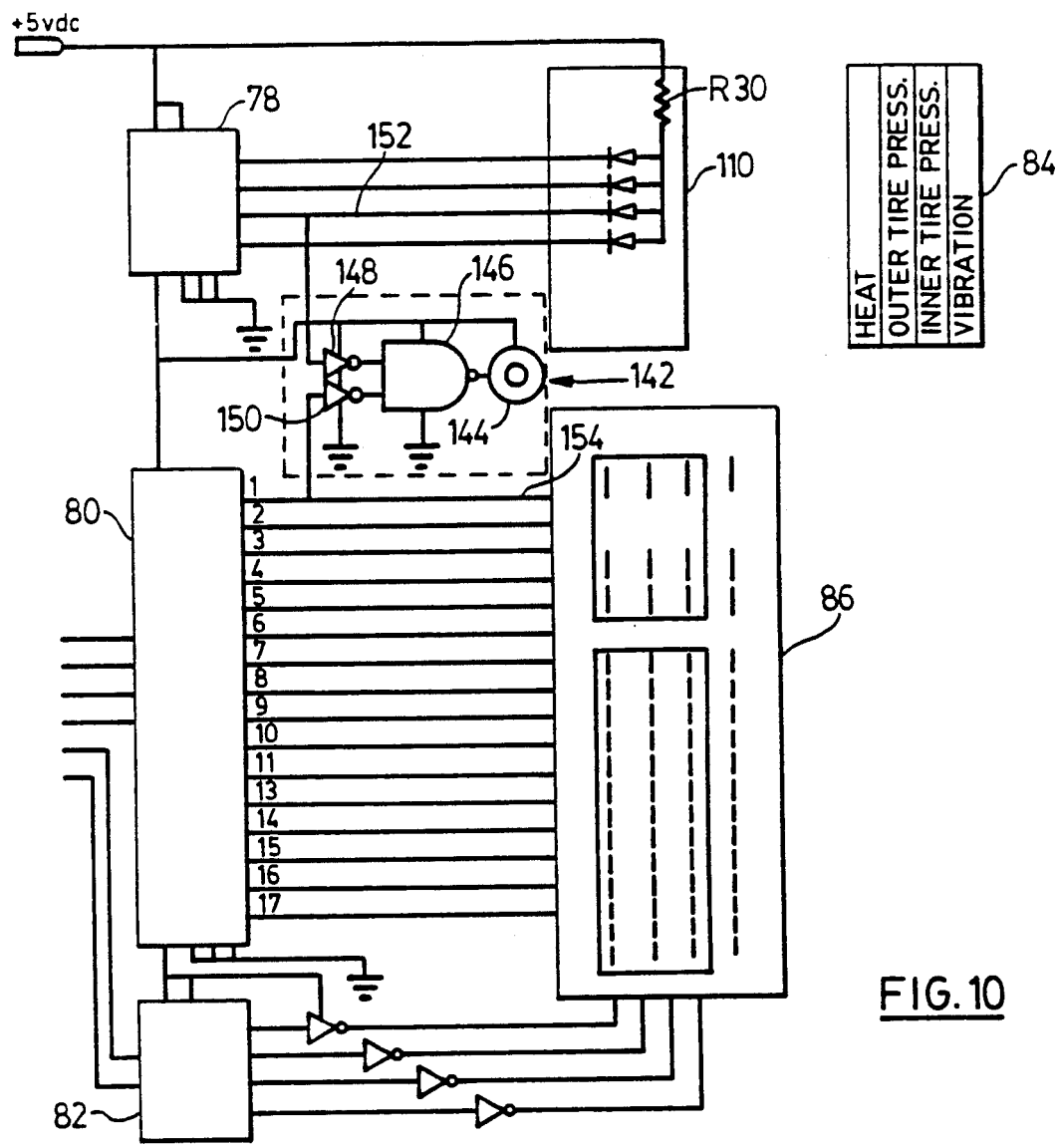
FIG. 10 is a circuit diagram of the display circuits for the monitor.

The circuit diagram of the display circuits, and the operation thereof, is identical in the second embodiment of the invention as in the first embodiment as illustrated in FIG. 10 and described herein before.

The specifications of the various resistors, capacitors, inductances, and transistors, as utilized in the second embodiment for monitor 10 are listed in the following table, however, it should be realized that these are by no means the only values acceptable to meet governmental regulations nor is the invention limited to the particular receiving means, decoding means, timing means, and display means disclosed.

| COMPONENTS | SPECIFICATIONS |
|---|---|
| R1 | 1K 1/4 watt 5% |
| R2 | 1K5 1/4 watt 5% |
| R3 | 4K7 1/4 watt 5% |
| R4 | 6K2 1/4 watt 5% |
| R5 | 750 Ohm 1/4 watt 5% |
| R6 | 47K 1/4 watt 5% |
| R7 | 10K 1/4 watt 5% |
| R8 | 1K 1/4 watt 5% |
| R9 | 220K 1/4 watt 5% |
| R10 | 5K6 1/4 watt 5% |
| R11 | 91K 1/4 watt 5% |
| R12 | 13K 1/4 watt 5% |
| R13 | 2K2 1/4 watt 5% |
| R14 | 330 Ohm 1/4 watt 5% |
| R15 | 3K3 1/4 watt 5% |
| R16 | 330 Ohm 1/4 watt 5% |
| R30 | 470 Ohm 1/4 watt 5% |
| C1-3 | 2pf +/− .2 pf ceramic disk |
| C4,6 | 33pf +/− 5% |
| C5 | .001 mf +/− 10% |
| C7 | 100pf +/− 10% |
| C8 | Variable Tuner Capacitor |
| C9 | 1 mf electrolytic |
| C10 | .01 mf ceramic disk |
| C11 | .001 mf ceramic disk |
| C12 | .022 mf ceramic disk |
| C13 | .0033 mf ceramic disk |
| C14 | .1 mf ceramic disk |
| C15 | 47 mf 160 electrolytic |
| L1 | 14 turns #22 wire |
| L2 | Inductive link |
| Q1 | PN918 |
| Q2 | 2N5210 |
| Q3 | PN2219 |
| Q4 | 2N2222 |
| SCR1 | C106B |

Finally, it will be understood that variations or alternatives can be introduced or included to the apparatus described and illustrated by those persons skilled in this field without departing from the spirit or scope of the invention defined by the appended claims.

What I claim is:

1. A warning system for sensing conditions at a remote source comprising a transmitter located in the region of said remote source for transmitting a coded signal in response to an abnormal condition sensed at said remote source, said coded signal comprising information of the abnormal condition sensed and the location of said transmitter, and a monitor for receiving said transmitted coded signal and indicating said abnormal condition sensed and the location of said transmitter; said transmitter comprising a power supply for said transmitter, sensing means responsive to an abnormal condition at said remote source, coding means comprising a silicon controlled rectifier gate array connected to said power supply and said sensing means for activating said transmitter when said sensing means detects an abnormal condition, and comprising means for generating a coded signal in response to said activation of said transmitter when said sensing means detects an abnormal condition, and means connected to said coding means for transmitting said generated coded signal; said monitor comprising a power supply for said monitor, means for receiving said transmitted coded signal, means connected to said detecting means for decoding said signal received, and means connected to said decoding means for indicating said abnormal condition sensed by said sensing means of said transmitter and comprising matrix means for indicating said location of said transmitter.

2. A warning system according to claim 1 wherein said coding means of said transmitter comprises a parallel to serial converter.

3. A warning system according to claim 2 wherein said parallel to serial converter of said coding means of said transmitter is a universal asynchronous receiver/transmitter circuit.

4. A warning system according to claim 1 wherein said coding means of said transmitter comprises an encoder circuit connected to said silicon controlled rectifier gate array, a data latch circuit connected to said encoder circuit, and a parallel to serial converter connected to said data latch circuit.

5. A warning system according to claim 4 wherein said parallel to serial converter of said coding means of said transmitter is a universal asynchronous receiver/transmitter circuit.

6. A warning system according to claim 2, or 4, wherein said transmitting means of said transmitter comprises a transmit timing circuit connected to said parallel to serial converter, an inverter circuit connected to said parallel to serial converter, an amplification circuit connected to said inverter circuit, and an oscillator circuit connected to said amplification circuit, and said coded signal generated is transmitted by said transmitting means of said transmitter as a radio frequency signal.

7. A warning signal according to claims 1, 2, or 3, wherein said coded signal generated comprises a first part identifying the location of said remote source where said abnormal condition is sensed, and a second part identifying the type of abnormal condition sensed.

8. A warning system according to claims 2, or 3, wherein said coded signal generated comprises a first part identifying the location of said remote source where said abnormal condition is sensed, and a second part identifying the type of abnormal condition sensed, and said coding means of said transmitter comprises a dip switch assembly connected to said parallel to serial converter for supplying said first part of said coded signal identifying the location of said transmitter.

9. A warning system according to claim 2, or 4, wherein said transmitting means of said transmitter comprises a transmit timing circuit connected to said parallel to serial converter, an inverter circuit connected to said parallel to serial converter, an amplification circuit connected to said inverter circuit, and an oscillator circuit connected to said amplification circuit, and said coded signal generated comprises a first part identifying the location of said remote source where said abnormal condition is sensed, and a second part identifying the type of abnormal condition sensed, and said coded signal generated is transmitted by said transmitting means of said transmitter as a radio frequency signal.

10. A warning system according to claim 2, or 4, wherein said coded signal generated comprises a first part identifying the location of said remote source where said abnormal condition is sensed, and a second part identifying the type of abnormal condition sensed, and said coding means of said transmitter comprises a dip switch assembly connected to said parallel to serial converter for supplying said first part of said coded signal identifying the location of said transmitter, and said transmitting means of such transmitter comprises a transmit timing circuit connected to said parallel to serial converter, an inverter circuit connected to said parallel to serial converter, an amplification circuit connected to said inverter circuit, and an oscillator circuit connected to said amplification circuit, and said coded signal generated is transmitted by said transmitting means of said transmitter as a radio frequency signal.

11. A warning signal according to claims 2, or 4, wherein said decoding means of said monitor comprises a serial to parallel converter.

12. A warning system according to claims 3, or 5, wherein said decoding means of said monitor comprises a universal asynchronous receiver/transmitter circuit as a serial to parallel converter.

13. A warning system according to claims 2, or 4, wherein said transmitting means of said transmitter comprises a transmit timing circuit connected to said parallel to serial converter, an inverter circuit connected to said parallel to serial converter, an amplification circuit connected to said inverter circuit, and an oscillator circuit connected to said amplification circuit, and said coded signal generated is transmitted by said transmitting means of said transmitter as a radio frequency signal, and said means for receiving said transmitted coded signal from said transmitter of said monitor comprises an antenna, a tuned circuit connected to said antenna, amplification circuits connected to said tuned circuit, and an inverter circuit connected to said amplification circuits.

14. A warning system according to claims 3, or 5, wherein said transmitting means of said transmitter comprises a transmit timing circuit connected to said parallel to serial converter, an inverter circuit connected to said parallel to serial converter, an amplification circuit connected to said inverter circuit, and an oscillator circuit connected to said amplification circuit, and said coded signal generated is transmitted by said transmitted means of said transmitter as a radio frequency signal, and said means for receiving said transmitted coded signal from said transmitter of said monitor comprises an antenna, a tuned circuit connected to said antenna, amplification circuits connected to said tuned circuit, and an inverter circuit connected to said amplification circuits, and said decoding means of said monitor comprises a universal asynchronous receiver/transmitter circuit as a serial to parallel converter connected to said inverter circuit of said receiving means of said monitor.

15. A warning system according to claims 2, or 4, wherein said decoding means of said monitor comprises a serial to parallel converter, and said means for indicating said abnormal condition sensed of said monitor comprises electronic circuit means including, an audio warning circuit connected to said serial to parallel converter, a decoder circuit connected to said serial to parallel converter, and a visual display circuit connected to said decoder circuit.

16. A warning system according to claims 2, or 4, wherein said decoding means of said monitor comprises a serial to parallel converter, and said means for indicating said abnormal condition sensed of said monitor comprises electronic circuit means including an audio warning circuit connected to said serial to parallel converter, a decoder circuit connected to said serial to parallel converter, and a visual display circuit connected to said decoder circuit, and said matrix means of said monitor for indicating the location of said transmitter includes said visual display circuit in the form of an L.E.D. matrix.

17. A warning system according to claims 3, or 5, wherein said coded signal generated comprises a first part identifying the location of said remote source where said abnormal condition is sensed, and a second part identifying the type of abnormal condition sensed, and said coding means of said transmitter comprises a dip switch assembly connected to said parallel to serial converter for supplying said first part of said coded signal identifying the location of said transmitter, and said transmitting means of such transmitter comprises a transmit timing circuit connected to said parallel to serial converter, an inverter circuit connected to said parallel to serial converter, an amplification circuit connected to said inverter circuit, and an oscillator circuit connected to said amplification circuit, and said coded signal generated is transmitted by said transmitting means of said transmitter as a radio frequency signal, and said means for receiving said transmitted coded signal from said transmitter of said monitor comprises an antenna, a tuned circuit connected to said antenna, amplification circuits connected to said tuned circuit, and an inverter circuit connected to said amplification circuits, and said decoding means of said monitor comprises a universal asynchronous receiver/transmitter circuit as a serial to parallel converter connected to said inverter circuit of said receiving means of said monitor, and said means for indicating said abnormal condition sensed of said monitor comprises electronic circuit means including, an audio warning circuit connected to said serial to parallel converter, a decoder circuit connected to said serial to parallel converter, and a visual display circuit connected to said decoder circuit.

18. A warning system according to claim 3, or 5, wherein said coded signal generated comprises a first part identifying the location of said remote source where said abnormal condition is sensed, and a second part identifying the type of abnormal condition sensed, and said coding means of said transmitter comprises a dip switch assembly connected to said parallel to serial converter for supplying said first part of said coded signal identifying the location of said transmitter, and said transmitting means of such transmitter comprises a transmit timing circuit connected to said parallel to serial converter, an inverter circuit connected to said parallel to serial converter, an amplification circuit connected to said inverter circuit, and an oscillator circuit connected to said amplification circuit, and said coded signal generated is transmitted by said transmitting means of said transmitter as a radio frequency signal, and said means for receiving said transmitted coded signal from said transmitter of said monitor comprises an antenna, a tuned circuit connected to said antenna, amplification circuits connected to said tuned circuit, and an inverter circuit connected to said amplification circuits, and said decoding means of said monitor comprises a universal asynchronous receiver/transmitter circuit as a serial to parallel converter connected to said inverter circuit of said receiving means of said monitor, and said means for indicating said abnormal condition sensed of said monitor comprises electronic circuit means including an audio warning circuit connected to said serial to parallel converter, a decoder circuit connected to said serial to parallel converter, and a visual display circuit connected to said decoder circuit, and said matrix means of said monitor for indicating the location of said transmitter includes said visual display circuit in the form of an L.E.D. matrix.

19. A warning system according to claim 1 wherein said coding means of said transmitter comprises an inverter circuit connected to said silicon controlled rectifier gate array, an encoder circuit connected to said inverter circuit, and a parallel to serial converter connected to said encoder circuit.

20. A warning system according to claim 19 wherein said parallel to serial converter of said coding means of said transmitter is a universal asynchronous receiver/transmitter circuit.

21. A warning system according to claim 19, wherein said transmitting means of said transmitter comprises a transmit timing circuit connected to said parallel to serial converter, a modulator circuit connected to said parallel to serial converter, an amplification circuit connected to said modulator circuit, and an oscillator circuit connected to said amplification circuit, and said coded signal generated is transmitted by said transmitting means of said transmitter as a radio frequency signal.

22. A warning signal according to claim 19 wherein said coded signal generated comprises a first part identifying the location of said remote source where said abnormal condition is sensed, and a second part identifying the type of abnormal condition sensed, and said coding means of said transmitter comprises a dip switch assembly connected to said parallel to serial converter for supplying said first part of said coded signal identifying the location of said transmitter, and said transmitter means of such transmitter comprises a transmit timing circuit connected to said parallel to serial converter, a modulator circuit connected to said parallel to serial converter, an amplification circuit connected to said modulator circuit, and an oscillator circuit connected to said amplification circuit, and said coded signal generated is transmitted by said transmitting means of said transmitter as a radio frequency signal.

23. A warning system according to claim 19 wherein said decoding means of said monitor comprises a serial to parallel converter.

24. A warning system according to claim 20 wherein said decoding means of said monitor comprises a universal asynchronous receiver/transmitter circuit as a serial to parallel converter.

25. A warning system according to claim 20 wherein said transmitting means of said transmitter comprises a transmit timing circuit connected to said parallel to serial converter, a modulator circuit connected to said parallel to serial converter, an amplification circuit connected to said modulator circuit, and an oscillator circuit connected to said amplification circuit, and said coded signal generated is transmitted by said transmitting means of said transmitter as a radio frequency signal, and said means for receiving said transmitted coded signal from said transmitter of said monitor comprises an antenna, a tuned circuit connected to said antenna, amplification circuits connected to said tuned circuit, and a demodulator circuit connected to said amplification circuits, and said decoding means of said monitor comprises a universal asynchronous receiver/transmitter circuit as a serial to parallel converter connected to said demodulator circuit of said receiving means of said monitor.

26. A warning system according to claim 19 wherein said decoding means of said monitor comprises a serial to parallel converter, and said means for indicating said abnormal condition sensed of said monitor comprises electronic circuit means including, an audio warning circuit connected to said serial to parallel converter, a decoder circuit connected to said serial to parallel converter, and a visual display circuit connected to said decoder circuit.

27. A warning system according to claim 19 wherein said decoding means of said monitor comprises a serial to parallel converter, and said means for indicating said abnormal condition sensed of said monitor comprises electronic circuit means including an audio warning circuit connected to said serial to parallel converter, a decoder circuit connected to said serial to parallel converter, and a visual display circuit connected to said decoder circuit, and said matrix means of said monitor for indicating the location of said transmitter includes said visual display circuit in the form of an L.E.D. matrix.

28. A warning system according to claim 20 wherein said coded signal generated comprises a first part identifying the location of said remote source where said abnormal condition is sensed, and a second part identifying the type of abnormal condition sensed, and said coding means of said transmitting comprises a dip switch assembly connected to said parallel to serial converter for supplying said first part of said coded signal identifying the location of said transmitter, and said transmitting means of such transmitter comprises a transmit timing circuit connected to said parallel to serial converter, a modulator circuit connected to said parallel to serial converter, an amplification circuit connected to said modulator circuit, and an oscillator circuit connected to said amplification circuit, and said coded signal generated is transmitted by said transmitting means of said transmitter as a radio frequency signal, and said means for receiving said transmitted coded signal from said transmitter of said monitor comprises an antenna, a tuned circuit connected to said antenna, amplification circuits connected to said tuned circuit, and a demodulator circuit connected to said amplification circuits, and said decoding means of said monitor comprises a universal asynchronous receiver/transmitter circuit as a serial to parallel converter connected to said demodulator circuit of said receiving means of said monitor, and said means for indicating said abnormal condition sensed of said monitor comprises electronic circuit means including, an audio warning circuit connected to said serial to parallel converter, a decoder circuit connected to said serial to parallel converter, and a visual display circuit connected to said decoder circuit.

29. A warning system according to claim 20 wherein said coded signal generated comprises a first part identifying the location of said remote source where said abnormal condition is sensed, and a second part identifying the type of abnormal condition sensed, and said coded means of said transmitter comprises a dip switch assembly connected to said parallel to serial converter for supplying said first part of said coded signal identifying the location of said transmitter, and said transmitting means of such transmitter comprises a transmit timing circuit connected to said parallel to serial converter, a modulator circuit connected to said parallel to serial converter, an amplification circuit connected to said modulator circuit, and an oscillator circuit connected to said amplification circuit, and said coded signal generated is transmitted by said transmitting means of said transmitter as a radio frequency signal, and said means for receiving said transmitted coded signal from said transmitter of said monitor comprises an antenna, a tuned circuit connected to said antenna, amplification circuits connected to said tuned circuit, and a demodulator circuit connected to said amplification circuits, and said decoding means of said monitor comprises a universal asynchronous receiver/transmitter circuit as a serial to parallel converter connected to said demodulator circuit of said receiving means of said monitor, and said means for indicating said abnormal condition sensed of said monitor comprises electronic circuit means including an audio warning circuit connected to said serial to parallel converter, a decoder circuit connected to said serial to parallel converter, and a visual display circuit connected to said decoder circuit, and said matrix means of said monitor for indicating the location of said transmitter includes said visual display circuit in the form of an L.E.D. matrix.

* * * * *